(12) United States Patent
Kim et al.

(10) Patent No.: US 7,773,978 B2
(45) Date of Patent: Aug. 10, 2010

(54) DEVICE AND METHOD FOR PROCESSING MESSAGE-RELATED EVENTS IN A PORTABLE TERMINAL

(75) Inventors: Jae-Ho Kim, Gumi-si (KR); Jeong-Wook Seo, Daegu (KR); Hyun-Ji Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1000 days.

(21) Appl. No.: 11/311,346

(22) Filed: Dec. 20, 2005

(65) Prior Publication Data

US 2006/0135136 A1 Jun. 22, 2006

(30) Foreign Application Priority Data

Dec. 20, 2004 (KR) ............ 10-2004-0108748
Dec. 5, 2005 (KR) ............ 10-2005-0117725

(51) Int. Cl.
*H04M 3/00* (2006.01)

(52) U.S. Cl. ............ 455/418; 455/414.1; 455/556.1; 709/218; 725/135

(58) Field of Classification Search ............ 455/418, 455/414.1, 466, 566, 556.1; 709/218; 725/135
See application file for complete search history.

(56) References Cited

U.S. PATENT DOCUMENTS

| | | | |
|---|---|---|---|
| 6,088,731 A | | 7/2000 | Kiraly |
| 6,396,513 B1 * | | 5/2002 | Helfman et al. ............ 715/752 |
| 7,013,329 B1 * | | 3/2006 | Paul et al. ............ 709/217 |
| 7,054,920 B2 * | | 5/2006 | Aoki et al. ............ 709/218 |
| 2003/0087665 A1 * | | 5/2003 | Tokkonen ............ 455/556 |
| 2004/0022217 A1 * | | 2/2004 | Korpela et al. ............ 370/335 |
| 2004/0156616 A1 * | | 8/2004 | Strub et al. ............ 386/46 |
| 2006/0053468 A1 * | | 3/2006 | Sudoh et al. ............ 725/135 |

FOREIGN PATENT DOCUMENTS

| | | |
|---|---|---|
| CN | 1472670 A | 2/2004 |
| EP | 1 309 158 | 5/2003 |
| EP | 1 387 241 | 2/2004 |

(Continued)

OTHER PUBLICATIONS

Muller, W et al.; "Face-to-Face with your Assistant. Realization issues of animated user interface agents for home appliances" Computers and Graphics, Pergamon Press Ltd. Oxford, GB vol. 25, No. 4, Aug. 2001 pp. 593-600.

(Continued)

*Primary Examiner*—Danh C Le
(74) *Attorney, Agent, or Firm*—Roylance, Abrams, Berdo & Goodman, L.L.P.

(57) ABSTRACT

Provided are a device and a method for processing message-related events generated in a portable terminal. The method for processing message-related events in a portable terminal comprises the steps of storing message-related events generated in the portable terminal, confirming specialists set in advance, so that the message-related events can be processed by the specialists, respectively, calling the confirmed specialists and processing the message-related events, and displaying the processing results set in advance with respect to the specialists with a text/avatar, according to the processing results which are processed by the specialists.

39 Claims, 20 Drawing Sheets

FOREIGN PATENT DOCUMENTS

| | | |
|---|---|---|
| JP | 200252682 | 9/2002 |
| KR | 20030078553 | 10/2003 |

OTHER PUBLICATIONS

"Method for Notifying Caller of Speed Dial Settings" IBM Technical Disclosure Bulletin, IBM Corp. New York, US vol. 36, No. 9B Sep. 1, 1993 pp. 21-22.

Swartz, "Why people hate the paperclip: labels, appearance, behavior and social responses to user interface agents", Stanford University, Stanford, U.S.A., XP002372788, Jun. 12, 2003, at http://xenon.stanford.edu/{Iswartz/paperclip/paperclip.pdf.

* cited by examiner

DEVICE AND METHOD FOR PROCESSING MESSAGE-RELATED EVENTS IN A PORTABLE TERMINAL

CROSS-REFERENCE TO RELATED PATENT APPLICATIONS

This application claims the benefit under 35 U.S.C. §119(a) of Korean Patent Application No. 2004-108748, filed Dec. 20, 2004, and Korean Patent Application No. 2005-117725, filed Dec. 2, 2005, in the Korean Intellectual Property Office, the entire contents of both of which are hereby incorporated by reference.

BACKGROUND OF THE INVENTION

1. Field of the Invention

The present invention relates to a device and a method for processing message-related events in a portable terminal. More particularly, the present invention relates to a device and a method for processing message-related events generated in a portable terminal.

2. Description of the Related Art

In general, a portable terminal refers to a device which a user can carry. An exemplary portable terminal is a mobile phone. Recently, mobile phones have been developed that provides additional functions in addition to the original phone function. Exemplary mobile phones having additional functions include a camcorder phone having a camera module, a TV phone on which TV can be watched, an MP3 phone by which MP3 (MPEG 3) music files can be listened, a DMB phone by which satellite broadcasts and/or terrestrial broadcasts can be watched. The trend in mobile phone development is to have additional functions capable of processing multimedia data.

Portable terminals having various additional functions generally include a LCD (Liquid Crystal Display) unit. Further, there is a trend in mobile phone development to have various display methods displaying the various functions and states of the portable terminal so that they can be more easily recognized. Accordingly, portable terminals have been developed that are capable of displaying various kinds of user data. The types of user data currently displayed in portable terminals mainly include visible user data such as a picture data, a character, an animation, or the like. Further, there is a trend in which avatar image data is being used more often in the portable terminals.

Accordingly, there is a need for an improved device and a method for processing message-related events generated in a portable terminal.

SUMMARY OF THE INVENTION

An aspect of the present invention is to address at least the above problems and/or disadvantages and to provide at least the advantages described below. Accordingly, an aspect of the present invention is to provide a device and a method for processing message-related events generated in a portable terminal.

It is another aspect of the present invention to provide a device and a method for processing message-related events in a portable terminal, in which a character UI (User Interface) including the most suitable specialist, which requests a user to perform a corresponding operation according to the kind of the message related event by analyzing the message-related events, can be selected and expressed.

It is still another aspect of the present invention to provide a device and a method for processing message-related events in a portable terminal, in which a character UI can be selected and expressed to show the message-related event generated in the portable terminal under the control of a control unit of the portable terminal.

In order to accomplish these aspects, there is provided a device for processing message-related events in a portable terminal, the device comprising a memory for storing a character UI image according to a message-related events; an event collection section for detecting the message-related event generated in the portable terminal and for generating an event message for the generated message-related event; an agent control section comprising a plurality of specialists for the message-related events, the agent control section determining a specialist of the specialists, which corresponds to the event message, and selecting and outputting a character UI ID, which corresponds to the message-related event of the determined specialist; and an agent expression section for accessing and outputting at least one of a character image and a text corresponding to the character UI ID according to the message-related event.

According to one aspect of the present invention, there is provided a method for processing message-related events in a portable terminal, the method comprising the steps of storing message-related events generated in the portable terminal; confirming specialists set in advance, so that the message-related events can be processed by the specialists, respectively; calling the confirmed specialists and processing the message-related events; and displaying the processing results set in advance with respect to the specialists with a at least one of a text and an avatar, according to the processing results which are processed by the specialists.

According to another aspect of the present invention, there is provided a method for processing message-related events in a portable terminal, the method comprising the steps of checking the number of unread messages in the portable terminal; and displaying at least one of a text and an avatar recommending that a user at least one of confirm and arrange the unread messages, if the number of the unread messages is greater than a threshold value.

According to another aspect of the present invention, there is provided a method for processing message-related events in a portable terminal, the method comprising the steps of checking the former message state with respect to the corresponding sender of the received messages, if a message is received by the portable terminal; and displaying a text/avatar recommending that a user at least one of ignore and reject the received messages, if the former messages of the corresponding sender have been ignored continuously at more than a threshold frequency.

According to another aspect of the, present invention, there is provided a method for processing message-related events in a portable terminal, the method comprising the steps of determining whether a corresponding sender whose received messages are more than the sent messages exists in the portable terminal; and displaying at least one of a text and an avatar recommending that a user send a message to the corresponding sender, if the corresponding sender exists.

According to another aspect of the present invention, there is provided a method for processing message-related events in a portable terminal, the method comprising the steps of determining whether a message which has been sent is the message sent to a same receiver by a threshold period within a threshold time range at more than a threshold frequency; setting a message sending timer, if the message which has been sent is the message sent to the same receiver by the threshold period in the threshold time range at more than the threshold frequency; determining whether a message is sent to the corresponding receiver within a threshold time range of a threshold day, in which the message is sent, if the message sending timer is set; and displaying at least one of a text and an avatar recommending that that a user send a message to the corresponding receiver, if a message is not sent to the corresponding receiver.

According to another aspect of the present invention, there is provided a method for processing message-related events in a portable terminal, the method comprising the steps of checking a generation period and a generation time range of a corresponding event, if the corresponding event is generated in the portable terminal; setting a timer of a corresponding event, if the corresponding event is generated repeatedly by a threshold period within a threshold time range at more than a threshold frequency; determining whether a corresponding event is generated within a threshold time range of a threshold day in which the corresponding event is generated by a threshold period, if the timer of the corresponding event is set; and displaying at least one of a text and an avatar recommending generation of a corresponding event, if the corresponding event is not generated.

According to another aspect of the present invention, there is provided a method for processing message-related events in a portable terminal, the method comprising the steps of checking the MMS use frequency for a threshold period of time in the portable terminal; and displaying at least one of a text and an avatar recommending that a user use the MMS, if the MMS use frequency is less than a threshold frequency for a threshold period of time.

According to another aspect of the present invention, there is provided a method for processing message-related events in a portable terminal, the method comprising the steps of determining whether a corresponding number of at least one of received and sent messages has made contact for a threshold period of time at more than a threshold frequency, if a message is at least one of received and sent in the portable terminal; determining whether the corresponding number of the at least one of received and sent messages exists in a directory, if the corresponding number of the at least one of received and sent messages is determined to perform contact for the threshold period of time at more than the threshold frequency; and displaying at least one of a text and an avatar recommending that a user add the corresponding number to a directory, if the corresponding number of the at least one of received and sent messages does not exist in the directory.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
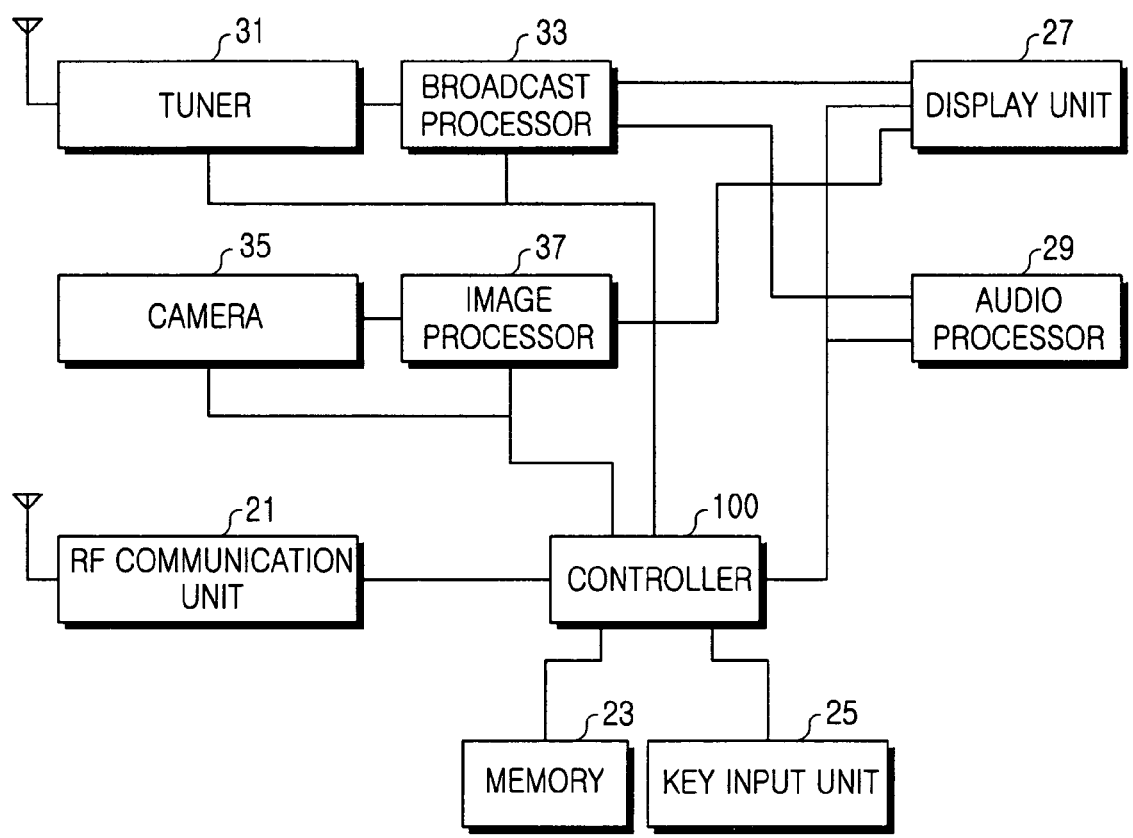
FIG. 1 is a block diagram of a portable terminal according to an exemplary embodiment of the present invention.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, an exemplary embodiment of the present invention will be described with reference to the accompanying drawings. It should be noted that, in the drawings, the same elements are endowed with the same reference numerals. Further, in the following description, details such as the kinds of events, examples of information required for expressing the agents and other similar details are represented for a better understanding of the exemplary embodiments of present invention. However, it will be apparent to those skilled in the art that the exemplary embodiments of present invention can be easily performed without using those details or by altering the details.

FIG. 1 is a block diagram for a portable terminal representing character agents of events generated in the portable terminal, according to an exemplary embodiment of the present invention. Referring to FIG. 1, an RF communication unit 21 performs a radio communication function for the portable terminal. The RF communication unit 21 includes an RF transmitter for up-mixing and amplifying signals for transmission and an RF receiver for amplifying received signals to have low noise and down-mixing. A key input unit 25 includes keys for inputting number and letter information and function keys for setting various functions. The key input unit 25 also includes keys for controlling character agents of events according to an exemplary embodiment of the present invention.

A memory 23 can include a program memory and a data memory. The program memory stores programs for processing signals of the portable terminal and programs for controlling expression of the agents with respect to the events generated, according to the exemplary embodiment of the present invention. The data memory temporarily stores data generated while performing the operations of the portable terminal. The data memory includes a character memory for storing character images for the agent expressions. The character memory can be operated using a file system, and can have indices of the memory (or file system) according to the characters. The character memory can be of various types, in which the operations and expressions of the characters, the expressions of objects, or the like, which are the detailed elements of the characters, can be shown. In other words, the character information, which is stored in the character memory, can be stored in various types in which the agents can be expressed.

A control unit 100 controls the overall operations of the portable terminal. The control unit 100 includes a modem which modulates and demodulates signals, and a codec which encodes and decodes signals, so that it can encode and modulate signals for transmission, and demodulates and decodes received signals. The control unit 100 may be an MMS (mobile station modem) chip. The control unit 100 controls the operation of the portable terminal in a communication mode, a camera mode, and a broadcasting reception mode, according to a mode selection by a user. The control unit 100 may be a data processing section in which a modem and a codec are separated from each other. The data processing section is located between the control unit 100 and the RF communication unit 21.

The control unit 100 may include an agent function section which can process message-related events, according to the exemplary embodiment of the present invention. The agent function section collects message-related events according to the operation of the portable terminal, and controls the agents according to the collected message-related events, thereby visually expressing the process and state of the message-related events by using the agents. Further, the agent function section can display the expression of the events, by selecting corresponding characters from the memory 23. The agent function section may be included in the control unit 100 or be provided separately. The agent function section will be described in detail in FIG. 2.

If the control unit 100 does not include the agent function section, the control unit 100 can instead perform the operation of the agent function section, according to the exemplary embodiment of the present invention. In other words, if the number of unread messages in a message in-box is more than a threshold value, the control unit 100 can control the portable terminal to display a text/character which recommends arrangement/confirmation of the messages, according to the exemplary embodiment. Further, the control unit 100 can control the portable terminal to display a text/character which recommends ignoring/rejecting with respect to a sender of messages which have been ignored at more than a predetermined frequency, according to the exemplary embodiment of the present invention. If a message is not sent within a predetermined time range in which messages have been sent at every predetermined period, the control unit 100 can control the portable terminal to display a text/character which recommends sending a message to the corresponding receiver, according to the exemplary embodiment of the present invention. The control unit 100 can control the portable terminal to display a text/character which recommends transferring a message to a sender having a number of sent messages greater than the number of received messages, according to the exemplary embodiment of the present invention. If a reception/sending number does not exist in a directory after reception/sending of a message, the control unit 100 can control the portable terminal to display a text/character which recommends to a user that the reception/sending number be added to the directory, according to the exemplary embodiment of the present invention. Further, if the MMS in-use number is smaller than a threshold value for a predetermined time period, the control unit 100 can control the portable terminal to display a text/character which recommends use of the MMS, according to the exemplary embodiment of the present invention.

A camera module 35 is driven by the control unit 100 if a user selects the camera mode, and photographs a subject and generates photographed image signals. After scaling the image signals photographed by the camera module 35 to the size of a display unit 27, an image processing unit 37 has the image signals displayed by the display unit 27. In a storing mode, the image processing unit 37 encodes and stores the photographed signals in a predetermined manner. Further, in a mode in which the received or stored image data is reproduced, the image processing unit 37 decodes the encoded image data.

A tuner 31 receives broadcast signals of a channel set under the control of the control unit 100 in a broadcast reception mode. A broadcast processing unit 33 demodulates and decodes the broadcast signals received by the tuner 31, and outputs image and audio signals to the display unit 27 and the audio processing unit 29, respectively. Here, the broadcast signals may be satellite broadcast signals or terrestrial broadcast signals.

The display unit 27 can display menus according to the operation of the portable terminal, under the control of control unit 100, and displays a character corresponding to an event when the event is generated. Further, the display unit displays image signals outputted, from the image processing unit 37 or the broadcast processing unit 33 in a camera mode or a broadcast reception mode, respectively.

The audio processing unit 29 processes the audio signals generated in a communication mode under the control of control unit 100 in the communication mode, processes the audio signals generated in the camera mode while using the camera module to photograph under the control of image processing unit 100, and processes the broadcast audio signals received in the broadcast reception mode under the control of the broadcast processing unit 33.

In the above-mentioned portable terminal, the elements for processing the camera and/or broadcast signals can be omitted. However, even in this case, the character agent function with respect to the message-related events can be performed, according to the exemplary embodiment of the present invention. Hereinafter, characters are assumed to be avatars. Therefore, in the exemplary embodiment of the present invention, character agent control with respect to the message-related events of the portable terminal, will be described as avatar agent control. However, all the images except for avatars can be applied identically.

Figure 2:
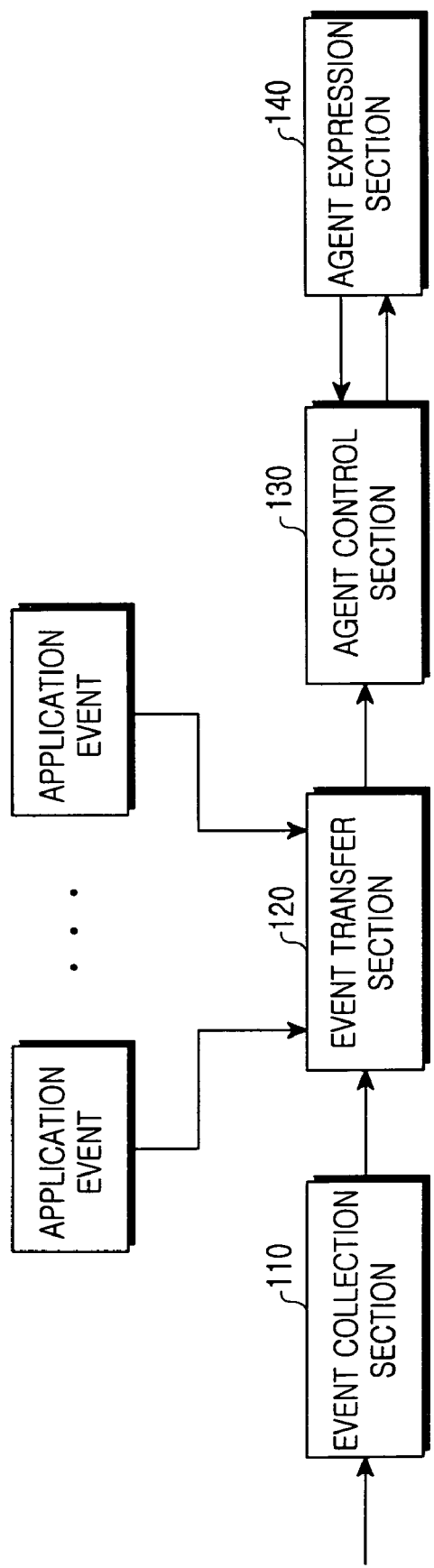
FIG. 2 is a block diagram of an agent function section of a portable terminal according to an exemplary embodiment of the present invention.

FIG. 2 is a block diagram of the agent function section according to the exemplary embodiment of the present invention.

Referring to FIG. 2, first, an event collection section 110 collects message-related events generated in the portable terminal. Here, the events may include all events which can be generated in the portable terminal, such as communication events of the portable terminal, events generated in the portable terminal itself, events generated by a request of a user, events related to performance of multimedia function of the portable terminal, or the like. In other words, the message-related events collected by the event collection section 110 become events defined by the portable terminal. The event collection section 110 generates event messages as information for discriminating the message-related events, and provides the event messages to an event transfer section 120.

The event transfer section 120 transfers the event messages provided by the event collection section 110 to clients. In the following description, although it is explained that the event transfer section 120 transfers the event messages only to an agent control section 130, the event messages can be transferred to another element requiring the transfer of the event messages.

In the event that messages are transferred from the event transfer section 120 to the agent control section 130, the transferred event messages are stored in an inner buffer and a UI (User Interface) is determined so that character agents corresponding to the event messages can be expressed. The event messages transferred from the event transfer section 120 can be any of the events of the portable terminal, such as the message-related events collected by the event collection section 110. In the following description, the agent expression of the message-related events collected by the event collection section 110 will be described. The agent control section 130 includes a plurality of specialists therein. The agent control section 130 controls the specialists and selects a specialist corresponding to the generated message-related event, thereby performing an agent control function. If message-related events are received, the agent control section 130 informs suitable specialists of the generation of the events according to the received message-related events, and requests an agent expression section an UI, so that the agent expression of the selected specialist is displayed. Further, feedback information from a user with respect to the corresponding message-related event is processed according to the feedback information from the user, which is received by the agent expression section 140.

The agent expression section 140 displays expressions of a character with respect to a corresponding event, such as a message-related event, according to the agent UI information outputted from the agent control section 130. Then, the agent expression section 140 manages a plurality of avatar UIs, which are to be displayed in the display unit 27, and controls the portable terminal to display the avatar corresponding according to the UI information requested by the agent control section 130. If a user generates feedback information in the state in which the avatar is displayed according to the generated message-related event, the agent expression section 140 transfers the received feedback information to the agent control section 130. The agent control section 130 performs the agent control according to the feedback information received from the agent expression section 140.

For the agent function section shown in FIG. 2, if only message-related events of the portable terminal are collected in the event collection section 110, the event transfer section 120 can be omitted. Here, an inner buffer of the agent control section 130 is referred to as a blackboard.

The agent control section 130 will be described below in detail. The agent control section 130 includes a plurality of specialists which are called according to the kinds of message-related events and, after a predetermined special work is performed, outputs a result. The agent control section 130 further includes a blackboard for storing information including the information of the event messages, a supervision section which, in the case in which a plurality of specialists output valid results, selects one specialist among them. Additionally, the agent control section 130 includes an avatar value storing section for storing the values of avatars according to the generated message-related events, a specialist management section which, when message-related events are generated, selects the corresponding specialists from a specialist list according to the events and controls the agents according to the message-related events.

The specialists contribute to solving problems. The specialists have specialties on restricted fields, and both record solutions in middle steps and expresses priorities and user preferences on the solutions in the middle steps. The specialists grasp the states of the blackboard and request the calculation of the priorities and user preferences, and records the solutions in the middle steps in the blackboard.

The blackboard is a working environment or an information space in which the specialists communicate with each other. Basically, the specialists record the solutions in the middle steps. The advantages of the blackboard pattern are as follows. First, the blackboard pattern allows several specialists of different kinds to be easily integrated. Second, since the specialists have little influence on each other, they can be developed so as to be independent modules. Third, the specialists are elastic to various changes, such as algorithm changes of the specialists, addition of new specialists, or the like.

If more than two specialists are selected with respect to one event, the specialist management section requests the supervision section to select a specialist that is most relevant to the received event. Then, the supervision section analyzes the data of the black board, the priorities and user preferences according to the events, and selects the most relevant specialist.

Then, the inner values of an avatar are changed by various events generated from the portable terminal, the agent function, and the feedback of the user. In addition, the various application events capable of using the avatar values also influence the avatar values. As the inner values of the avatar are changed, avatar interfaces are also changed and the avatar grows, which is the concept of avatar growth. The portable terminal according to the exemplary embodiment of the present invention introduces the rearing of avatar, on the basis of an artificial intelligence agent system. The exemplary embodiment of the present invention allows a user to use the portable terminal more effectively, by suggesting various actions to the user according to various events generated in the portable terminal. Further, the values of an avatar are changed according to the events and the feedback actions of a user.

The following Table 1 represents the kinds of message-related events in the portable terminal according to the exemplary embodiment of the present invention. In Table 1, use cases of message-related events, classification of message-related events, determination points of message-related events, action (processing) points of message-related events, parameters (required information) of message-related events, frequencies, illustration of conditions, UI texts, selection items of a user, or the like are arranged and displayed. Other message-related events can be added to or deleted from the above-mentioned message-related events.

trol of the control unit 100, in the case in which the agent function section is provided separately from the control unit 100 or is not provided in the portable terminal. FIGS. 15 to 20 are views of the operations of FIGS. 3 to 14 with avatars.

Figure 3:
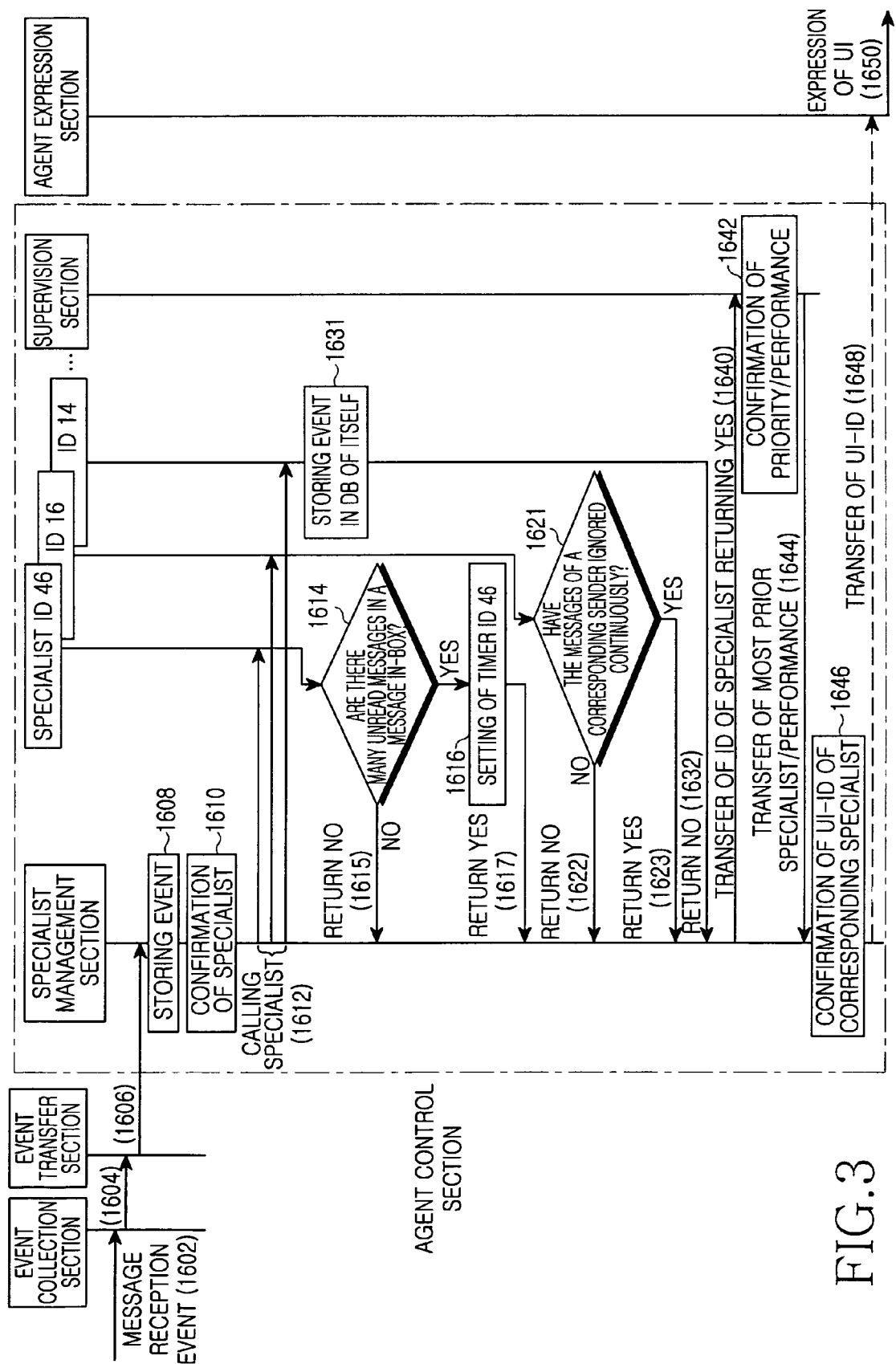
FIG. 3 is a flow chart for the message reception event processing operation of an agent function section of a portable terminal according to the first exemplary embodiment of the present invention.

FIG. 3 is a flow chart of the operations for processing message reception events in the agent function section of the portable terminal according to the first exemplary embodiment of the present invention.

Referring to FIG. 3, in the case in which message reception events are generated in Step 1602, the event collection section collects them and provides them to the event transfer section in Step 1604. Then, the event transfer section provides them to the specialist management section of the agent control section in Step 1606. The specialist management section stores the message reception events in the blackboard in Step 1608. Thereafter, the specialists, which are to be called in the message reception events, are confirmed in the inner specialist list in Step 1610. In the example of FIG. 3, the specialists of specialist Ids 46, 16, and 14 are called in Step 1612.

The specialist of ID 46 confirms whether the number of unread messages in the message in-box is large, in Step 1614. In other words, after confirming the number of unread mes-

TABLE 1

| ID | Use case | Classification | Required information of control unit | UI text | User selection item |
|---|---|---|---|---|---|
| 12 | Suggesting that a message is sent to a person which sends messages very often at a predetermined time or on a predetermined day | Message | AP_SMS_SEND/ Contact ID/Number | Won't you send a message to [Name] today? Do you want to send a message now? | yes/no |
| 14 | Recommending that a user send a message if many messages are received from a person and few messages are sent to the person | Message | AP_SMS_RECEIVE/ AP_SMS_SEND/ Contact ID/Number | Messages from [Name] are frequently received. Do you want to telephone to [Name]? | yes/no |
| 15 | Recommending that a user add a contact address if the contact address does not exist after the reception or sending of a message | Message | | Do you want to add [Number] to the contact address? | yes/no |
| 16 | Having the terminal select ignorance or rejection of a person or a number which has not confirmed messages | Message | AP_SMS_RECEIVE/ AP_MMS_RECEIVE/ Contact ID/Number | Messages from [Name] (or Number) you have not checked are received again. What do you want to do? | Seeing/later Seeing/rejection registration |
| 46 | Recommending that a user arrange or see an inbox if the number of unread messages in an inbox are large | Message | | The number of unread messages is large. Do you want to check them? | yes/no |
| 50 | Recommending that a user use an MMS if the user frequency of the MMS is small | Message | AP_MMS_SEND | Do you want to use an MMS to send a more fascinating message? | yes/no |

Referring to Table 1, the operation for processing message-related events in the portable terminal according to the exemplary embodiments of the present invention will be described in detail through FIGS. 3 to 20. FIGS. 3 to 4 and 7 to 10 explain processing the message-related event under the control of the agent function section. FIGS. 5 to 6 and 11 to 14 explain processing the message-related event under the consages, if the number of the unread messages is more than a threshold value. For example, if the unread messages exceeds a half of all the messages stored in the in-box, the number of the unread messages is considered large. Then, in the case in which the number of the unread messages is not large, 'NO' is returned to the specialist management section, in Step 1615. Further, in the case in which the number of the unread messages is large, after a suitable timer, such as ID 46, is set in Step 1616, 'No' is returned to the specialist management section in Step 1617.

The ID 16 specialist of the called specialists analyzes the corresponding reception message event and confirms the sender of the message in Step 1621. The ID specialist confirms whether the messages received from the sender are continuously deleted without confirmation. For example, continuously being deleted-more than three times or are ignored until a predetermined period of time elapses without confirmation. In the case in which the messages received from, the corresponding sender have not been continuously ignored, 'NO' is returned to the specialist management section in Step 1622. Further, In the case in which the messages received from the corresponding sender have been continuously ignored, 'YES' is returned to the specialist management section in Step 1623.

The ID 14 specialist stores the message reception event in a inner DB (database) of the corresponding specialist in Step 1631, and 'NO' is returned to the specialist management section in Step 1632.

If returns are performed by the called specialists, the specialist management section provides the specialist ID, for example, the specialist ID 16 of FIG. 3, which returns 'YES' in Step 1640 to the supervision section. Thereafter, in Step 1642, the supervision section confirms the priorities of the corresponding specialists or, when one specialist has returned 'YES', confirms whether the corresponding specialist has performed the return. Thereafter, in Step 1644, the supervision section transfers the confirmation result with respect to whether the most prior specialists or the corresponding specialist perform. Accordingly, the specialist management section confirms a UI-ID set in advance according to the ID of the most prior specialist or a specialist in Step 1646, and transfer the UI-ID to the agent expression section in Step 1648. Accordingly, the agent expression section expresses the corresponding UI in Step 1650. The corresponding UI can be expressed with a text/avatar which represents a content recommending ignorance/rejection with respect to the messages of the corresponding sender.

Meanwhile, in the case in which the ID 16 specialist returns 'YES', the specialist management section can ignore or reject the received message. Further, the ID 16 specialist may ignore or reject the corresponding received message by itself.

Figure 4:
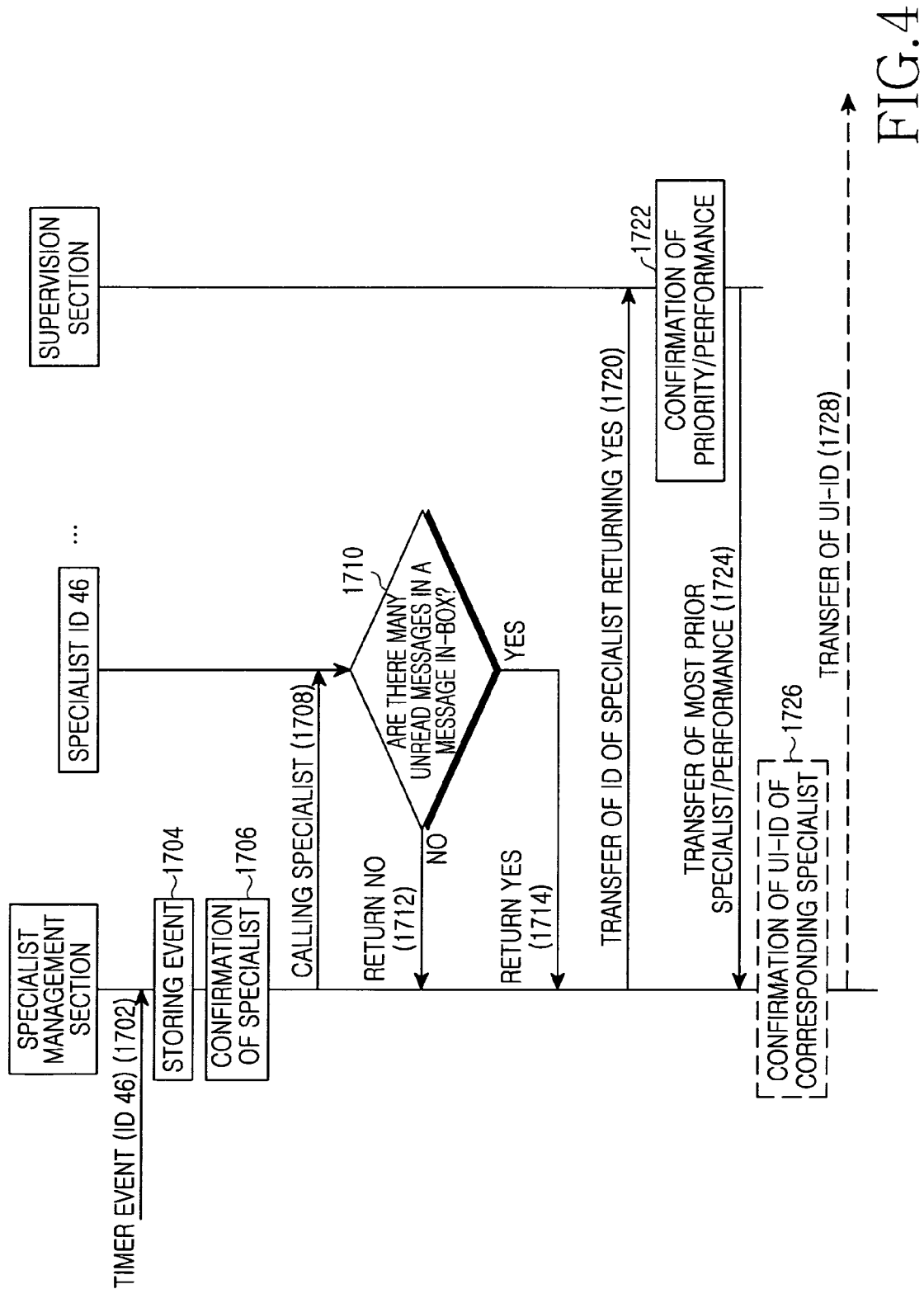
FIG. 4 is a flow chart for the timer event processing operation set by a specialist.

FIG. 4 is a flow chart of a timer event processing operation set by a specialist, such as specialist ID 46 of FIG. 3. FIG. 4 shows only the operation in the agent control section, for convenience sake, but the events provided to the corresponding agent control section can be provided through the event collection section and the event transfer section, as shown in FIG. 3.

Referring to FIG. 4, if a timer event of ID 46 is transferred in Step 1702, the specialist management section stores the timer event received in Step 1704 in the black board, and the specialists called in the timer event of ID 46 are confirmed in the inner specialist list in Step 1706, and the specialists, ID 46, are called in Step 1708.

The called specialist of ID 46 confirms whether the number of unread messages is large in the message in-box in Step 1710 again. Then, if the number of unread messages is small, 'NO' is returned to the special management section in Step 1712. Further, if the number of unread messages is large 'YES' is returned in Step 1714. The number of the unread messages is large when it exceeds half of all messages stored in the message in-box.

When a return is performed by the called specialist, such as ID 46, the specialist management section provides the specialist ID, such as ID 46, which returns 'YES' to the supervision section, in Step 1720. The supervision section confirms the priority/performance of the corresponding specialists in Step 1722, and transfers the confirmation result about the priority/performance to the specialist management section in Step 1724. Accordingly, the specialist management section confirms the UI-ID of the most prior specialist or the performing specialist in Step 1726, and the corresponding UI is expressed by transferring the UI-ID to the agent expression section in Step 1728. The corresponding UI can be expressed with a text/avatar representing the content in which the confirmation/arrangement of the received messages is recommended.

Figure 5:
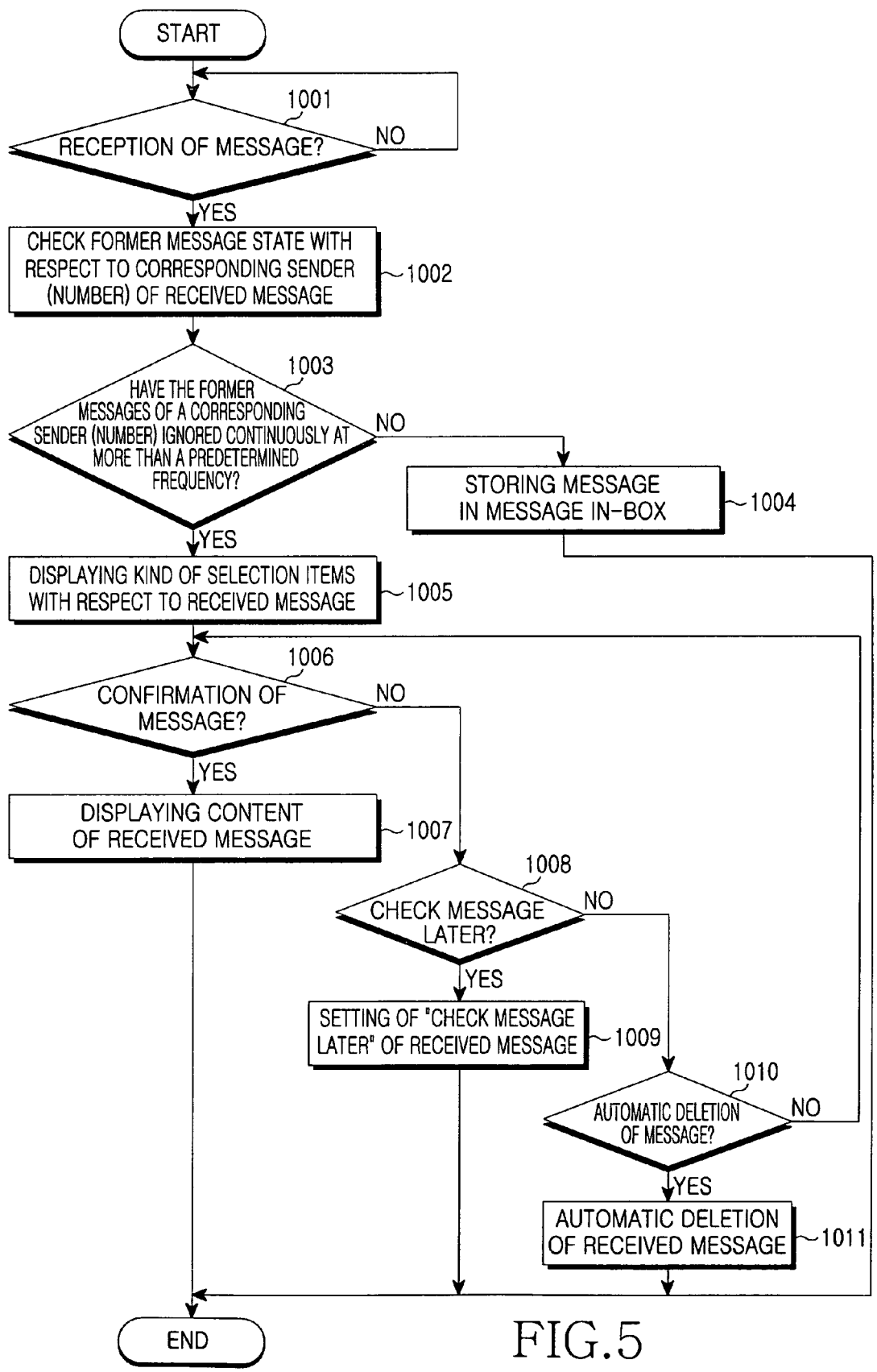
FIG. 5 is a flow chart for recommending that a user ignore a received message in a portable terminal according to the second exemplary embodiment of the present invention.

FIG. 5 is a flow chart for showing the operation in which ignorance of the received message is recommended in the portable terminal according to the second exemplary embodiment of the present invention.

Referring to FIG. 5, if a message is received, the control unit 100 detects it in Step 1001, and proceeds with Step 1002 in which the former message state of the corresponding sender (number) of the received message is checked. If the result checked in Step 1002 represents that the former messages received from the corresponding sender (number) have not been confirmed continuously at a predetermined frequency, for example, the messages have been deleted continuously more than three times or a predetermined time period has elapsed, the control unit 100 detects it in Step 1003 and proceeds with Step 1005 in which the kinds of selection items with respect to the received messages are displayed. However, if the result checked in Step 1002 represents that the former messages of the corresponding sender (number) have not be ignored, the control unit 100 detects it in Step 1003 and proceeds with Step 1004 in which the messages are stored in the message in-box.

If 'Check Message' of the selection items displayed in Step 1005 is selected, the control unit 100 detects it in Step 1006 and proceeds with Step 1007 in which the contents of the received messages are displayed. Further, if 'Seeing message later' of the selection items is selected, the control unit 100 detects it in Step 1008, does not display the received messages, and proceeds with Step 1009 in which 'Check the Message Later' is set. Further, 'Add to the Auto-delete List' of the selection items is selected, the control unit 100 detects it in Step 1010, and proceeds with Step 1011 in which the received message or the corresponding sender (number) of the received message is automatically deleted and ignored. Further, in Step 1011, the corresponding sender (number) of the received message can be added to an automatic deletion list, so that messages from the corresponding sender can be automatically deleted.

Figure 15A:
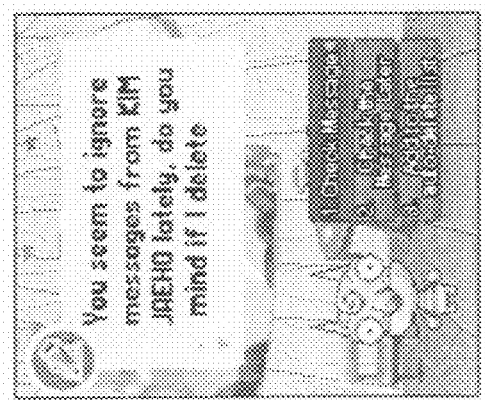
FIG. 15 is a view of an avatar recommending that a user ignore a received message in a portable terminal.
Figure 15B:
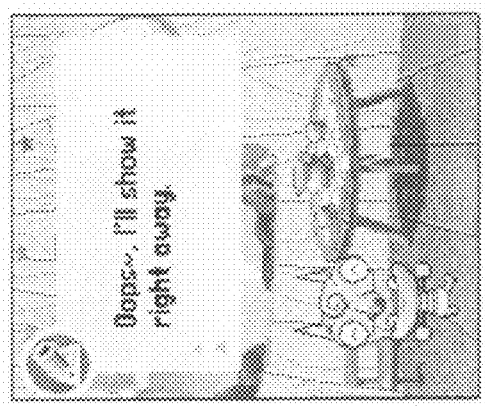
Figure 15C:
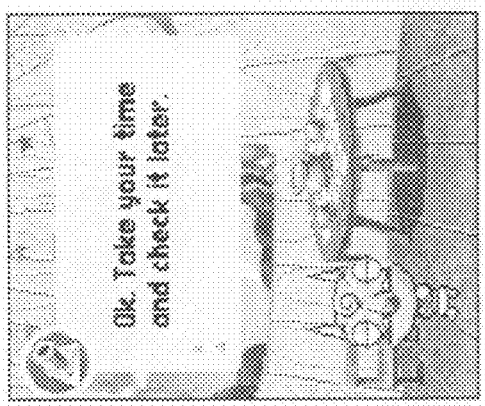
Figure 15D:

FIG. 15A represents an avatar which recommends Check Message/Check the Message Later/Add to the Auto-delete List with respect to the corresponding messages, when the timer event of ID 16 is generated in FIG. 3 or a sender (number) of the corresponding received message is continuously ignored at more than a predetermined frequency. As shown in FIG. 15A, the avatar informs a user of the fact that the corresponding received message is ignored and displays the kinds of the selection items. When, "1 Check message" is selected, as shown in FIG. 15B, the avatar displays a text which informs the user that the corresponding received message will be displayed, with a glad expression. Further, if a predetermined time period elapses or key input is performed for a predetermined key, the avatar disappears and the contents of the corresponding received message is displayed. However, if "Check the Message Later" is selected, as shown in FIG. 15C, the avatar displays a text which informs the user that the corresponding received message will be displayed, with a sorrowful expression. Further, if a predetermined time period elapses or key input is performed for a predetermined key, the avatar disappears. If "Add to the Auto-delete list" is selected, as shown in FIG. 15D, the avatar displays a text which informs the user that the sender (number) of the corresponding received message will be automatically deleted, with a sad expression. Further, if a predetermined time period elapses or key input is performed for a predetermined key, the avatar disappears.

Figure 6:
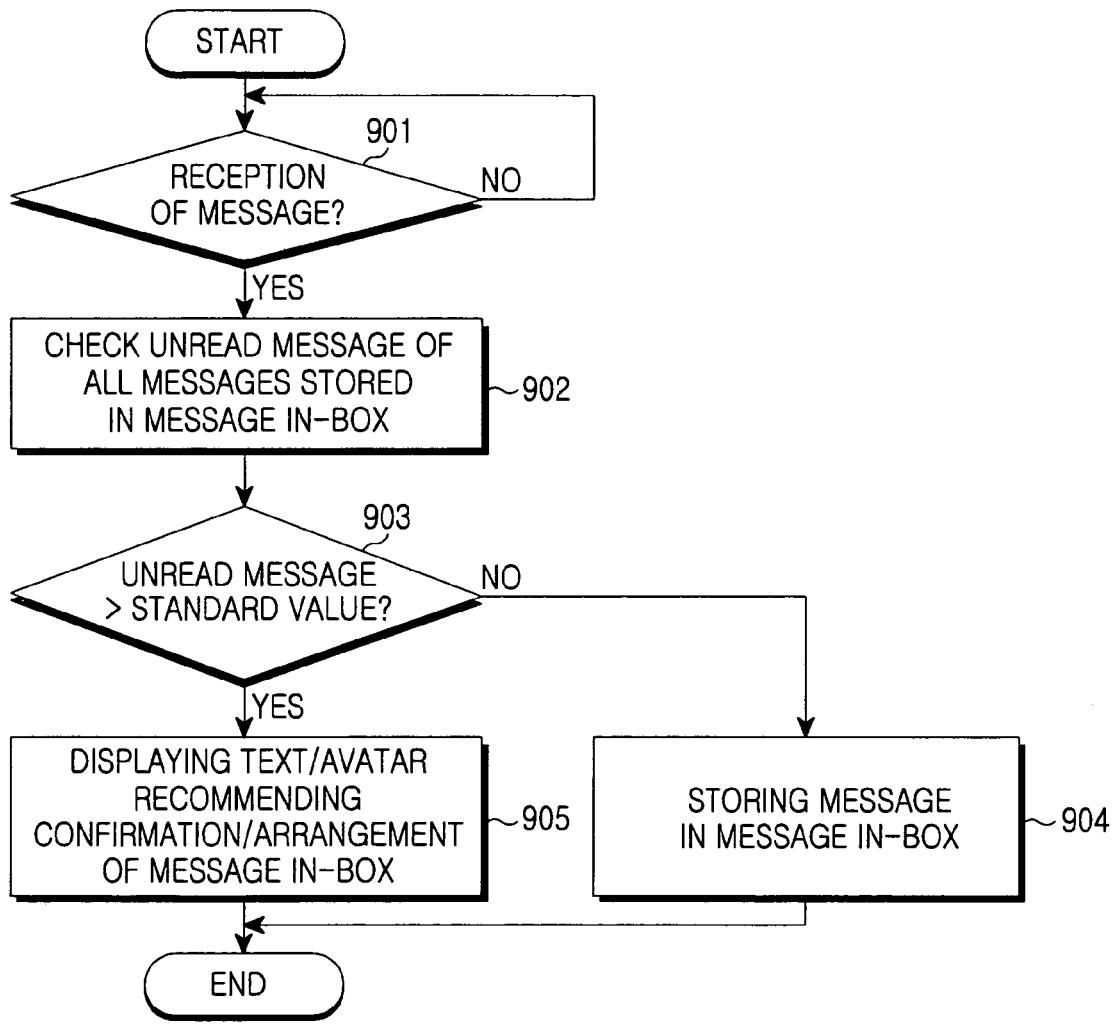
FIG. 6 is a flow chart for recommending that a user confirm unread messages in a portable terminal according to the second exemplary embodiment of the present invention.

FIG. 6 is a flow chart for recommending that a user confirm unread messages in the portable terminal according to the second exemplary embodiment of the present invention.

Referring to FIG. 6, if a message is received in the portable terminal, the control unit 100 detects it in Step 901, and proceeds with Step 902 in which the number of unread messages of all the messages stored in the message in-box is checked. If the number of the unread messages of the message in-box exceeds a threshold value, for example, if the number of the unread messages is less than half the number of all the messages stored in the message in-box, the control unit 100 detects it in Step 903, and proceeds with Step 904 in which the received messages are stored in the message in-box. However, the number of the unread messages of the message in-box exceeds a threshold value, for example, if the number of the unread messages of the message in-box is more than a threshold value, the control section 100 detects it in Step 903, and proceeds with Step 905 in which the content which recommends a user to confirm/arrange the unread messages stored in the message in-box is displayed with a text/avatar. The check of unread messages stored in the message in-box can be performed whenever the messages are received or at a predetermined period.

Figure 7:
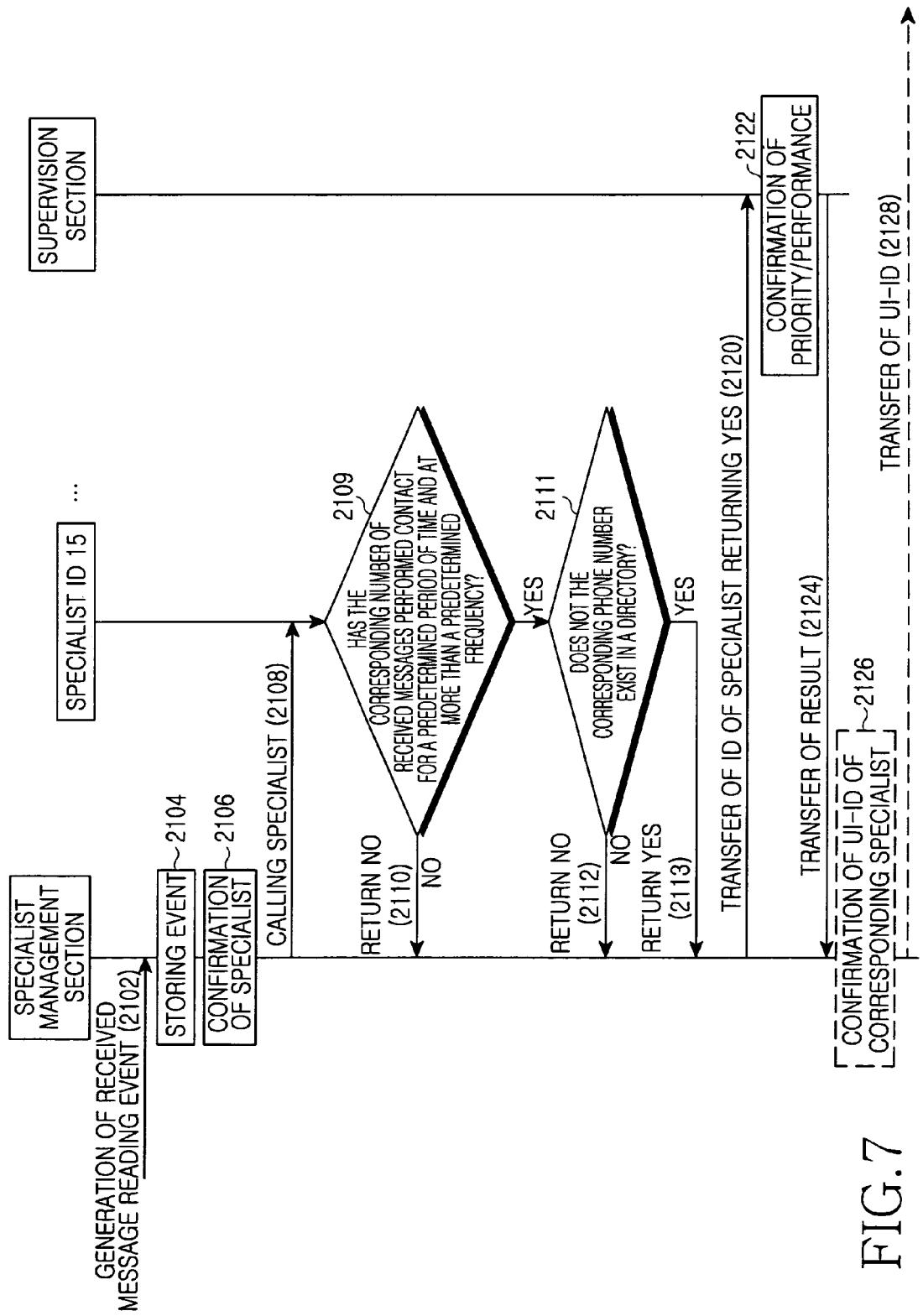
FIG. 7 is a flow chart for a processing a reception message reading event in an agent function section of a portable terminal according to the first exemplary embodiment of the present invention.
Figure 16A:
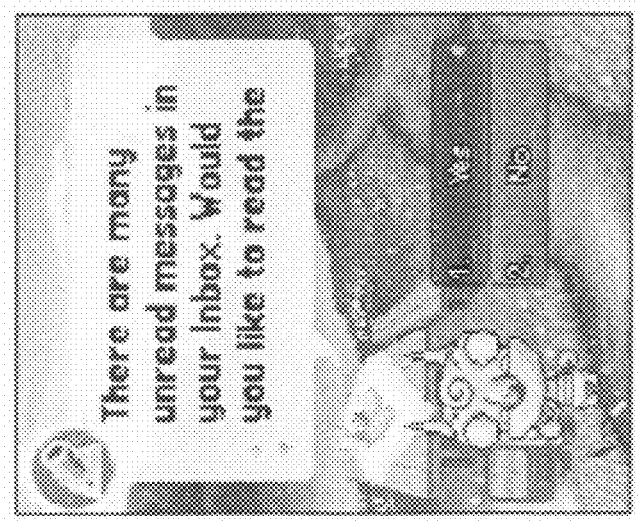
FIG. 16A-16C are views of an avatar recommending that a user confirm unread messages in a portable terminal.
Figure 16B:
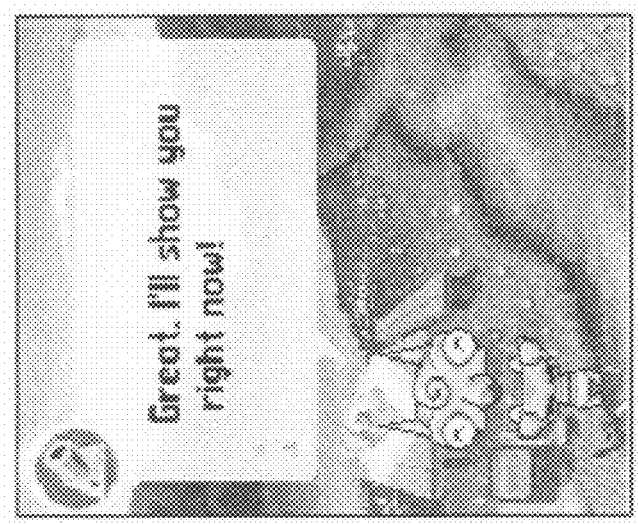
Figure 16C:

FIG. 16A-FIG. 16C represent an avatar which recommends confirmation/arrangement of unread messages in a message in-box, when a timer event of ID 46 is generated in FIG. 4 or in Step 905 of FIG. 6. If there are more unread messages than a threshold value in the message in-box, as shown in FIG. 16A, an avatar is displayed, and tells the user that there are many unread messages in the message in-box and asks the user whether he would perform confirmation/arrangement. If "1.Yes" is selected, as shown in FIG. 16B, the avatar displays a text informing the user that the unread messages in the message in-box will be shown immediately, with a glad expression. Further, if a predetermined time period elapses or key input is performed for a predetermined key, the avatar disappears and the unread messages stored in the message in-box are displayed. However, if "2. No" is selected, as shown in FIG. 16C, the avatar displays a text informing a user that the unread messages in the message in-box are left as they are, with a sad expression. Further, if a predetermined time period elapses or key input is performed for a predetermined key, the avatar disappears FIG. 7 is a flow chart of the operation in which a read message event is processed in the agent function section of the portable terminal according to the first exemplary embodiment of the present invention. In FIG. 7, only the operation in the agent control section is shown for convenient explanation.

Referring to FIG. 7, if an event representing that the received messages are read is transferred in Step 2102, the specialist management section stores the received event in the black board in Step 2104. Thereafter, the specialists called in the read message event are confirmed in the inner specialist list in Step 2106, and the specialists are called in Step 2108. In FIG. 7, a specialist of ID 15 is called.

The called specialist of ID 15 analyzes the corresponding read message event in Step 2109, and confirms talking records and reception/sending records of the message, which are stored in the memory, in order to learn that the sender side phone number of the received message has performed communication for a predetermined period of time, 30 days for example, at more than a predetermined frequency, more than two times for example. After the confirmation, if contact has not been made for a predetermined period of time and at more than a predetermined frequency, 'NO' is returned in Step 2110. Further, if contacts have been performed for a predetermined period of time and at more than a predetermined frequency, whether the sender side phone number of the received messages exists is confirmed in Step 2111. If the corresponding phone number is stored in the directory, 'NO' is returned to the specialist management section in Step 2112, and if the corresponding phone number is not stored in the directory, 'YES' is returned to the specialist management section in Step 2113.

If the return is performed by the called specialist, such as ID 15, the specialist management section provides the specialist ID, such as ID 15, which has returned 'YES' in Step 2120. The supervision section confirms the priority/performance of the corresponding specialists in Step 2122, and transfers the confirmation result to the specialist management section in Step 2124. Accordingly, the specialist management section confirms the UI-ID of the most prior specialist or a specialist to perform, in Step 2126, and allows the corresponding UI to be expressed by transferring the UI-ID to the agent expression section in Step 2128. The corresponding UI can be expressed with a text/avatar recommending a user that the sender side phone number of the corresponding received message is added to the directory.

Figure 8:
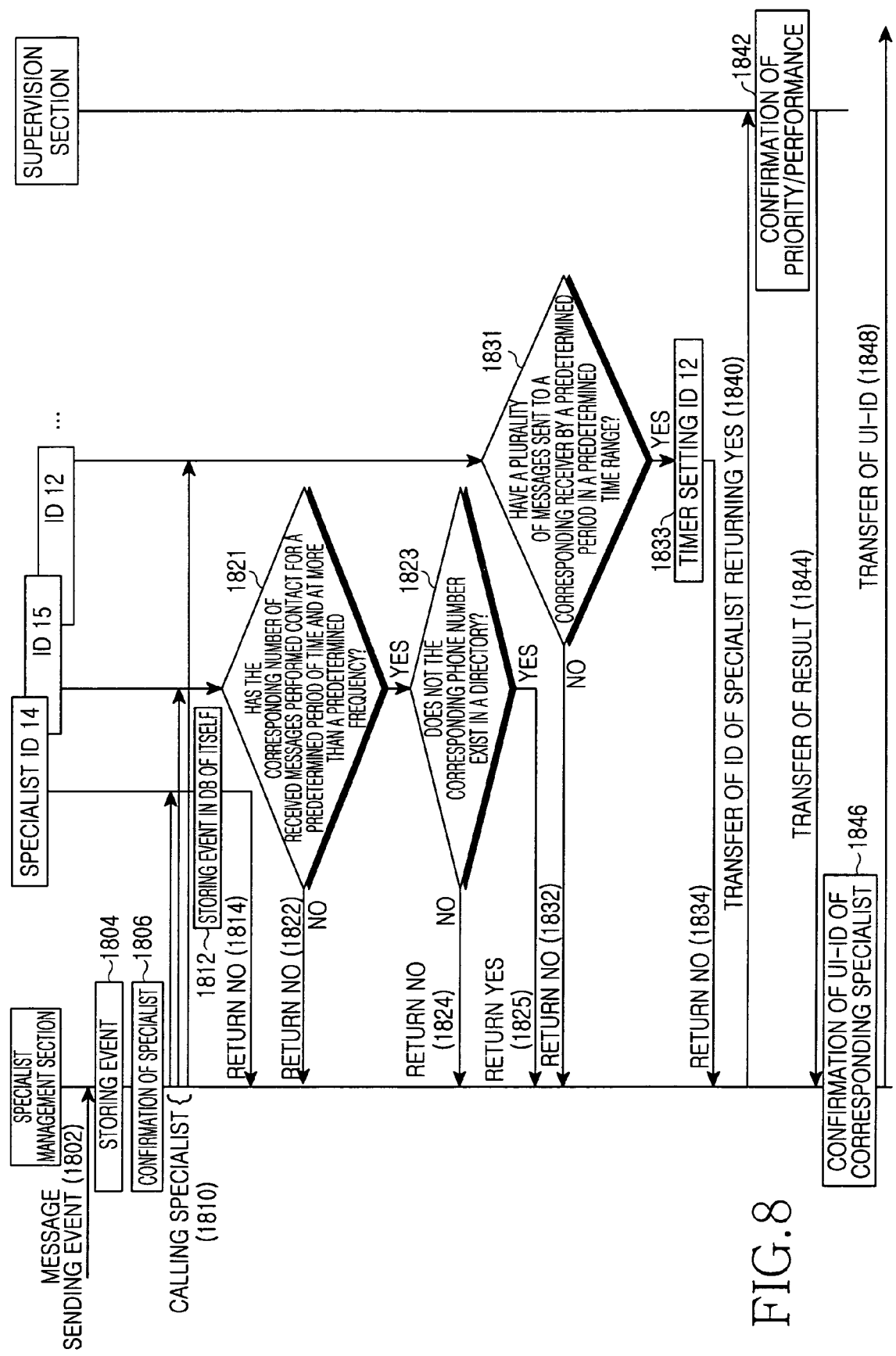
FIG. 8 is a flow chart for a processing a message sending event in an agent function section of a portable terminal according to the first exemplary embodiment of the present invention.

FIG. 8 is a flow chart for processing message sending events in the agent function section according to the first exemplary embodiment of the present invention. In FIG. 8, only the operation in the agent control section is shown for convenient explanation.

Referring to FIG. 8, if a message sending event is received in Step 1802, the specialist management section stores the message sending event received in Step 1804 in the blackboard. Thereafter, the specialists called in the message sending event are confirmed in the inner specialist list, in Step 1806, and the specialists are called in Step 1810. In FIG. 8, the specialists of IDs 14, 15, and 12 are called.

The called ID 14 specialist stores the message sending event in its own DBin Step 1812, and returns 'NO' to the specialist management section in Step 1814.

The called specialist of ID 15 analyzes the corresponding message sending event in Step 1821, and confirms talking records and reception/sending records of the message, which are stored in the memory, in order to learn that the receiver side phone number of the sending message has performed communication for a predetermined period of time, 30 days for example, and at more than a predetermined frequency, more than two times for example. After the confirmation, if a contact has not been made for a predetermined period of time and at more than a predetermined frequency, 'NO' is returned in Step 1822. Further, if contacts have been performed for a predetermined period of time and at more than a predetermined frequency, whether the receiver side phone number of the sending messages does not exist is confirmed in Step 1823. If the corresponding phone number is stored in the directory, 'NO' is returned to the specialist management section in Step 1824, and if the corresponding phone number is not stored in the directory, 'YES' is returned to the specialist management section in Step 1825.

The ID 12 specialist of the called specialists confirms whether messages have been sent to a corresponding receiver of the sent messages at a predetermined frequency for a predetermined time period in Step 1831. After the confirmation, if messages have not been sent to the corresponding receiver at a predetermined frequency for the predetermined time period, 'NO' is returned to the specialist management section in Step 1832. However, if messages have been sent to the corresponding receiver at a predetermined frequency for the predetermined time period, 'YES' is returned to the specialist management section in Step 1834 after a suitable timer, such as timer ID 12, is set in Step 1833.

If a return is performed by the called specialist, such as ID 15, the specialist management section provides the IDs of the specialist which returns 'YES' in Step 1840 to the supervision section. Thereafter, in Step 1842, the supervision section confirms the priority/performance of the corresponding specialist. Thereafter, in Step 1844, the supervision section transfers the confirmation result with respect to whether the most prior specialists or the corresponding specialist perform to the specialist management section. Accordingly, the specialist management section confirms a UI-ID set in advance according to the ID of the most prior specialist or a specialist in Step 1846, and transfer the UI-ID to the agent expression section in Step 1848. Accordingly, the agent expression section expresses the corresponding UI. The corresponding UI can be expressed with a text/avatar which represents a content recommending the user to add the phone number of the corresponding receiver to the directory.

Figure 9:
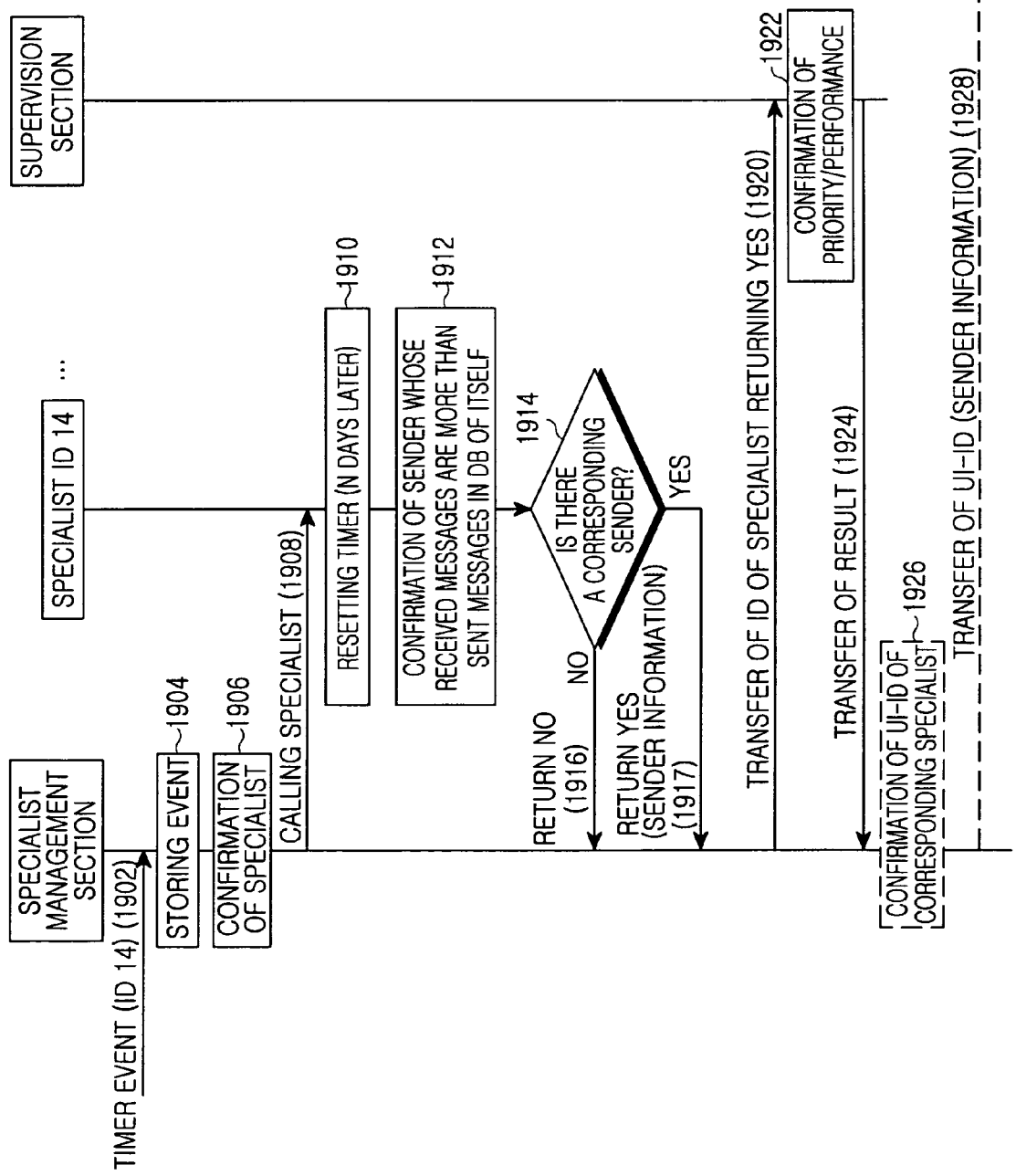
FIG. 9 is a flow chart for a processing a timer event set by a specialist.

FIG. 9 is a flow chart for the timer event processing operation set by a specialist, such as ID 14. In FIG. 9, only the operation in the agent control section is shown for convenient explanation.

Referring to FIG. 9, if the timer event of ID 14 is transferred in Step 1902, the specialist management section stores the timer event in a blackboard in Step 1904. Thereafter, the specialist management section confirms the specialists called in the timer event of ID 14 in the inner specialist list in 1906, and calls the specialists in Step 1908. In FIG. 9, the specialist of ID 14 is called.

The called specialist of ID 14 resets the timer to, for example, N days later in Step 1910. The timer is reset to call and operate the specialist N days later. Accordingly, the specialist of ID 14 is repeatedly called by a period of N days. In Step 1912, the specialist compares the number of sent messages with the number of received messages with respect to the corresponding senders in its own DB, and confirms whether a sender whose number of received messages is more than the number of received messages. Thereafter, in Step 1914, the specialist confirms whether the corresponding sender exists. After the confirmation, if the corresponding sender does not exist, the specialist proceeds with Step 1916 and 'NO' is returned to the specialist management section. Further, if the corresponding sender exists, the specialist returns 'YES' in Step 1917. Then, when 'YES' is returned, the information of the corresponding sender can be returned together.

If the return is performed by the called specialist, such as ID 14, the specialist management section provides the ID 14 specialist which has returned 'YES' to the supervision section in Step 1920. The supervision section confirms the priorities/performances of the corresponding specialists in Step 1922, and transfers the confirmation result on the most prior specialist/performance to the specialist management section in Step 1924. Accordingly, the specialist management section confirms the UI-ID of the most prior specialist or the specialist to perform in Step 1926, and then allows the UI to be expressed by transferring the UI-ID to the agent expression section in Step 1928. The corresponding UI can be expressed with a text/avatar which represents the content recommending message sending to the corresponding sender. Then, in the case in which the UI-ID corresponding to the ID 14 specialist is transferred, the sender information is also transferred and the name of the corresponding sender can be expressed in the UI.

Figure 10:
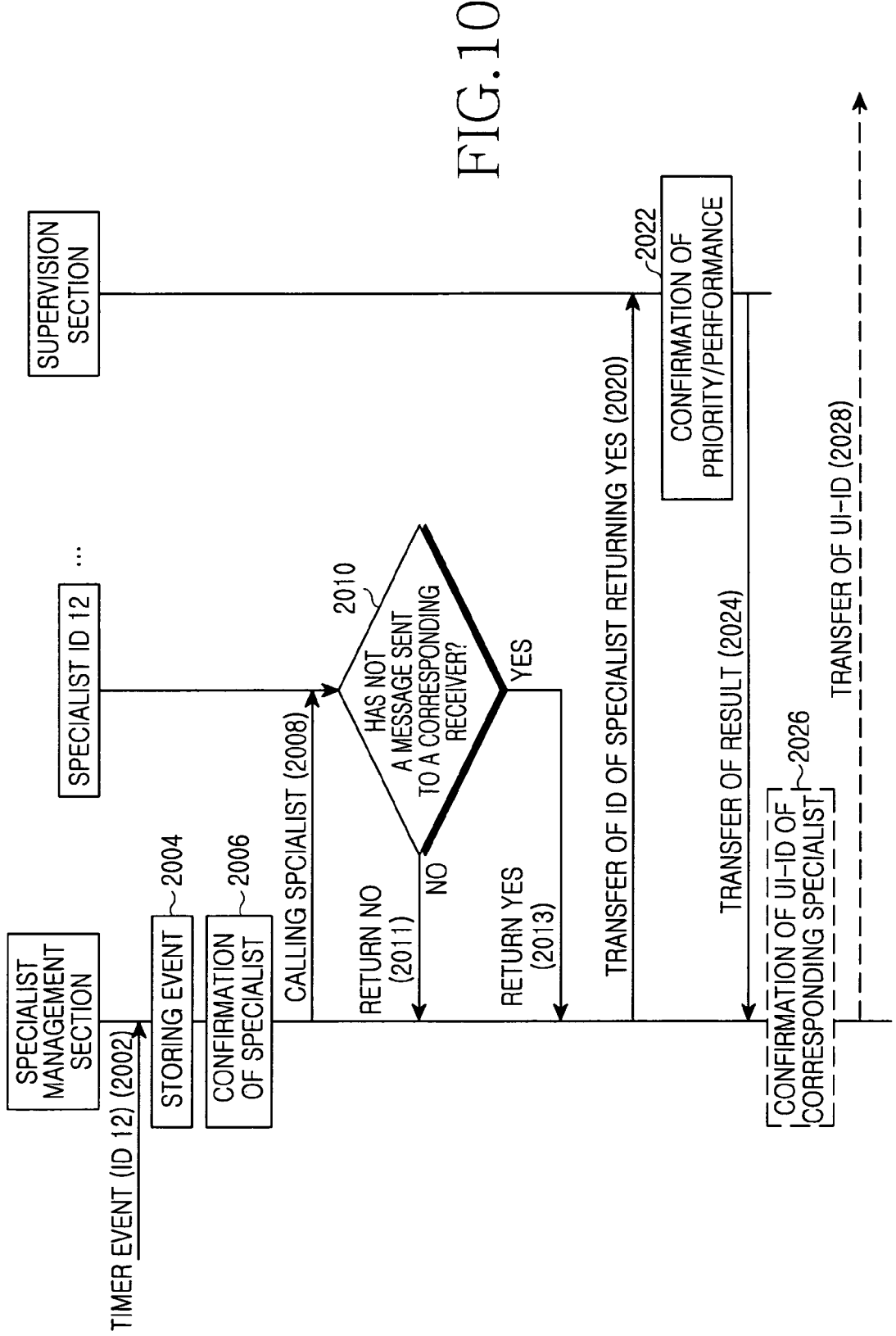
FIG. 10 is a flow chart for a processing a timer event set by another specialist.

FIG. 10 is a flow chart for the timer event processing operation set by another specialist, such as ID 12. In FIG. 10, only the operation in the agent control section is shown for convenient explanation.

Referring to FIG. 10, if the time event of ID 12 is transferred in Step 2002, the specialist management section stores the received time event in a blackboard in Step 2004. Thereafter, the specialist management section confirms the specialists called in the timer event of ID 12 in the inner specialist list in Step 2006, and calls the specialists in Step 2008. In FIG. 10, the specialist of ID 12 is called.

The called specialist of ID 12 confirms whether a message is sent to the corresponding receiver in Step 2010. After the confirmation, if a message is sent to the corresponding receiver, 'NO' is returned to the specialist management section in Step 2011. Further, if a message is not sent to the corresponding receiver, 'YES' is returned in Step 2013.

Hereinafter, the case in which a message has not been sent to the corresponding receiver is explained. For example, if a user of the portable terminal sends a message to the corresponding receiver at 10:20 A.M. on the first Wednesday, sends a message to the corresponding receiver at 10:40 A.M. on the second Wednesday, 7 days later, and sends a message to the corresponding receiver at 10:10 A.M. on the third Wednesday, 7 days later again, the portable terminal detects that messages are sent to the corresponding receiver within a predetermined time range every predetermined period, 7 days for example, and the timer ID 12 is set as in Step 1833 of FIG. 8. The predetermined time range may be from a first predetermined time 30 minutes for example, earlier than the time at which the final message is sent to the time at which the final message is sent, from the time at which the final message is sent to a second predetermined time later than the time at which the final message is sent, or from the first predetermined time to the second predetermined time. Thereafter, on the fourth Wednesday, after 7 days later again, whether a message is sent to the corresponding receiver from 9:40 A.M. which is 30 minutes earlier than the time at which a message is sent to the corresponding receiver on the third Wednesday, 10:10 A.M., is confirmed. If a message is not sent to the corresponding receiver from 9:40 A.M. to 10:10 A.M. on the fourth Wednesday, 'YES' is returned to the specialist management section in Step 2013.

If the return is performed by the called specialist, such as ID 12, the specialist management provides the ID 12 specialist which returned 'YES' in Step 2020 to the supervision section. Thereafter, the supervision section confirms the priority/performance of the corresponding specialists in Step 2022, and transfers the confirmation result to the specialist management section in Step 2024. Accordingly, the specialist management section confirms the UI-ID of the most prior specialist or the specialist to perform in Step 2026 and the UI-ID is transferred to the agent expression section to express the corresponding UI in Step 2028. Then, the corresponding UI of the ID 12 specialist can be expressed with a text/avatar which represents the content recommending the message sending to the corresponding receiver.

Figure 11:
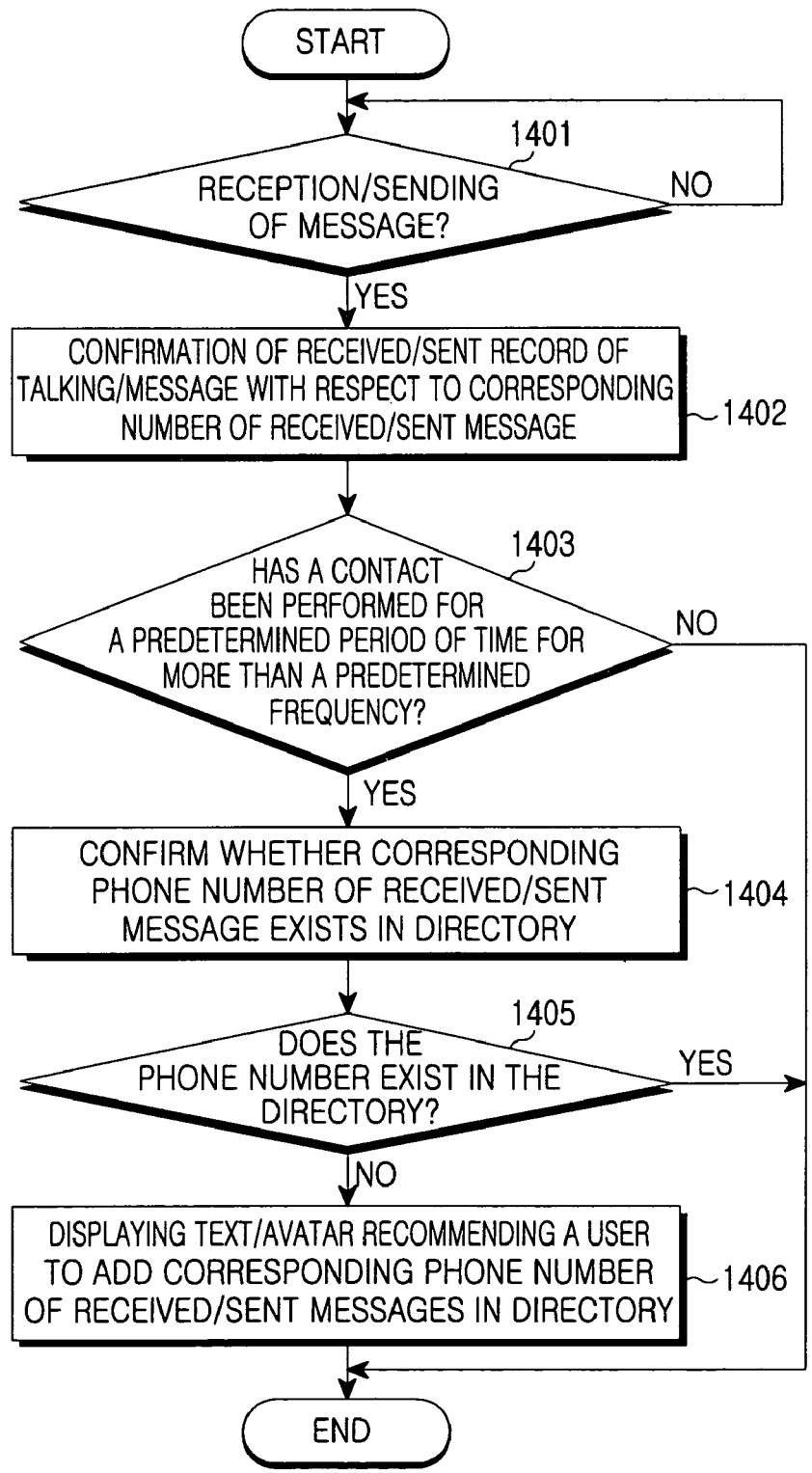
FIG. 11 is a flow chart for recommending that a user add a corresponding number of received/sent messages to a directory in a portable terminal according to the second exemplary embodiment of the present invention.

FIG. 11 is a flow chart for recommending addition of a corresponding number of a reception/sending message to a directory in the portable terminal according to the second exemplary embodiment of the present invention.

Referring to FIG. 11, if a message is received/sent by the portable terminal, the control unit 100 detects it in Step 1401, and proceeds with Step 1402 in which talking records and reception/sending records of the messages, which are stored in the memory, are confirmed in order to learn that the corresponding number of the received/sent message has performed communication for a predetermined period of time, 30 days for example, and at more than a predetermined frequency, more than two times for example. After the confirmation, if the corresponding phone number of the received/sent messages has performed contacts for a predetermined period of time and at more than a predetermined frequency, the control unit 100 detects it in Step 1403 and proceeds with Step 1404 in which it is confirmed whether the corresponding number of the received/sent messages exists in the directory of the portable terminal. If the corresponding number of the received/sent messages does not exist in the directory, the control unit 100 detects it in Step 1405 and proceeds with Step 1406 in which the control unit 100 controls the portable terminal so as to display a text/avatar recommending that a user add the corresponding number of the received/sent messages in the directory.

Figure 17A:
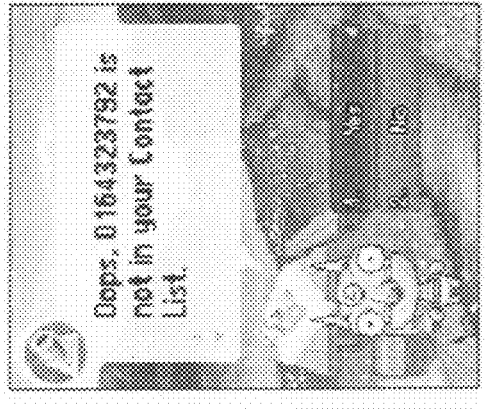
FIG. 17A-17D are views of an avatar recommending that a user add a corresponding number of received/sent messages in a portable terminal.
Figure 17B:
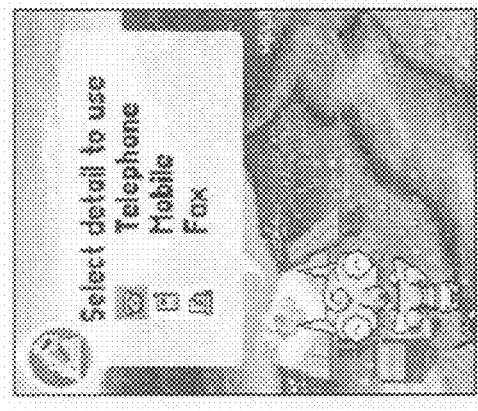
Figure 17C:
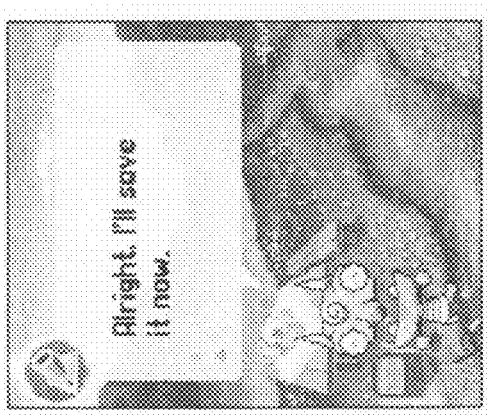
Figure 17D:

FIGS. 17A-17D show an avatar which recommends a user to add a corresponding number to a directory, in the case in which the timer event of ID 15 is generated in FIGS. 7 and 8 or the corresponding number of messages received/sent in Step 1401 of FIG. 11 does not exist in the directory. If the received/sent messages do not exist in the directory, as shown in FIG. 17A, an avatar is displayed to inform the user that the corresponding number of the received/sent messages does not exist in the directory and to display a text recommending the user to add the corresponding number to the directory. If, "1. Yes" is selected, as shown in FIG. 17B, the kinds of storage of the number are displayed with a glad expression of the avatar. If the storage kind of the corresponding number is selected, as shown in FIG. 17C, the avatar informs the user that the corresponding number has been stored in the storage kind of the selected number. Further, if a predetermined time period elapses or key input is performed for a predetermined key, the avatar disappears. However, if "2. No" is selected, as shown in FIG. 17D, the avatar displays a text representing that, with a sad expression. Further, if a predetermined time period elapses or key input is performed for a predetermined key, the avatar disappears.

Figure 12:
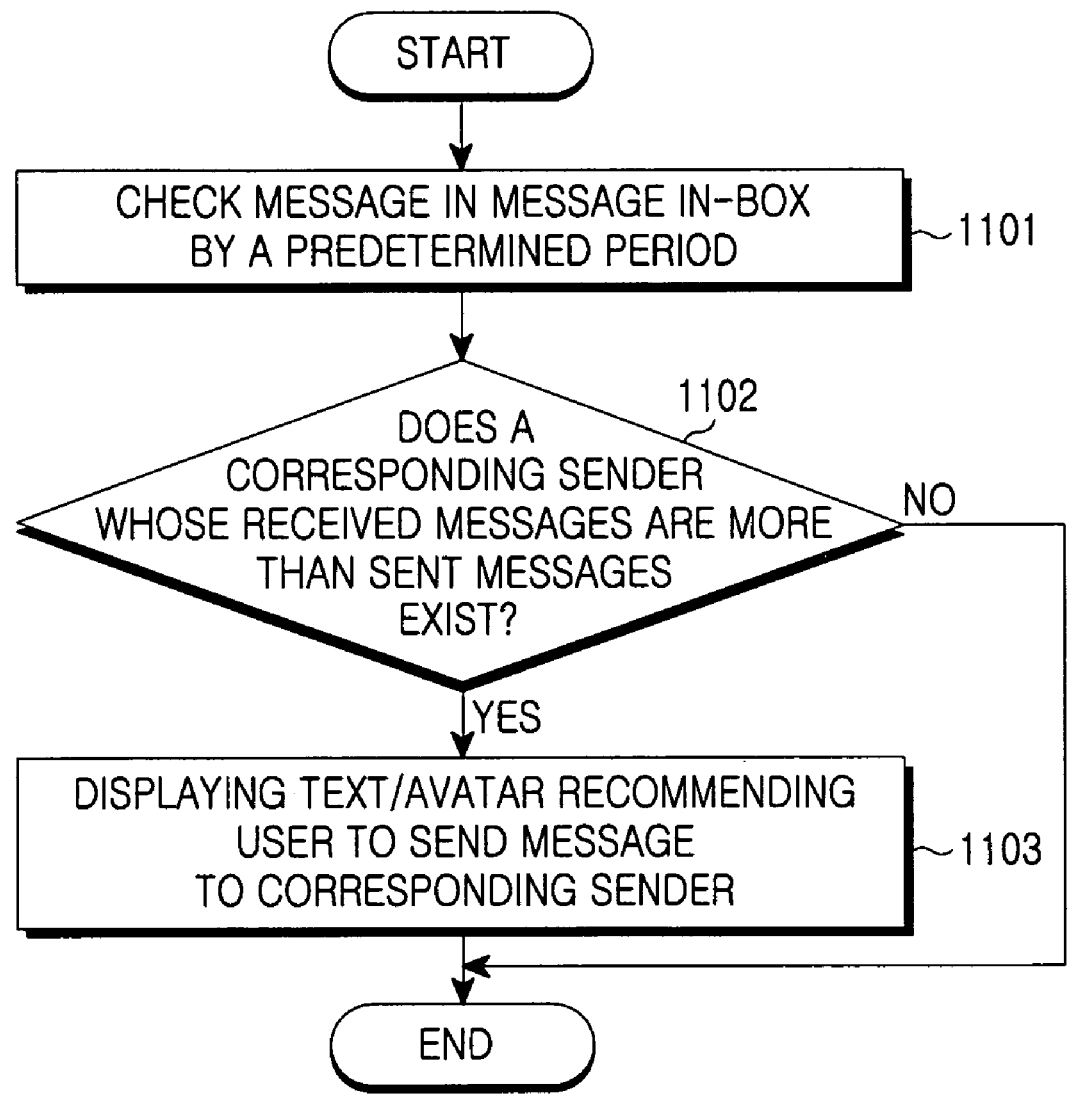
FIG. 12 is a flow chart for recommending that a user send a message to a sender whose number of received messages is greater than the number sent messages in a portable terminal according to the second exemplary embodiment of the present invention.

FIG. 12 is a flow chart for recommending that a user send a message to a sender whose number of received messages is greater than number of sent message in the portable terminal according to the second exemplary embodiment of the present invention.

Referring to FIG. 12, the control unit 100 of the portable terminal proceeds with Step 1101 in which the messages stored in the message in-box are checked by a predetermined period. The control section 100 checks the senders of the messages stored in the message in-box in Step 110, and confirms whether a sender exists whose received messages are greater in number than the number of messages sent by the sender. After the confirmation, if a sender exists whose number of received messages is greater than the messages sent by the sender, the control unit 100 detects it in Step 1102, and proceeds with Step 1103 in which a text/avatar recommending that a user send a message to the corresponding sender is displayed.

Figure 18A:
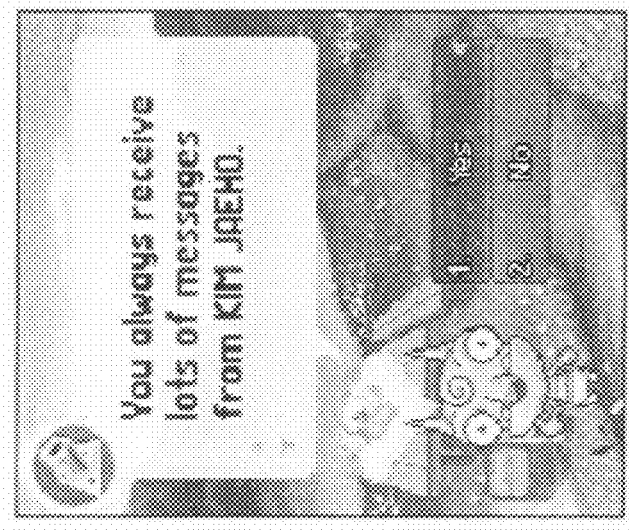
FIG. 18A-18C are views of an avatar recommending that a user send a message to a sender whose number of received messages is greater than the number of sent messages in a portable terminal.
Figure 18B:
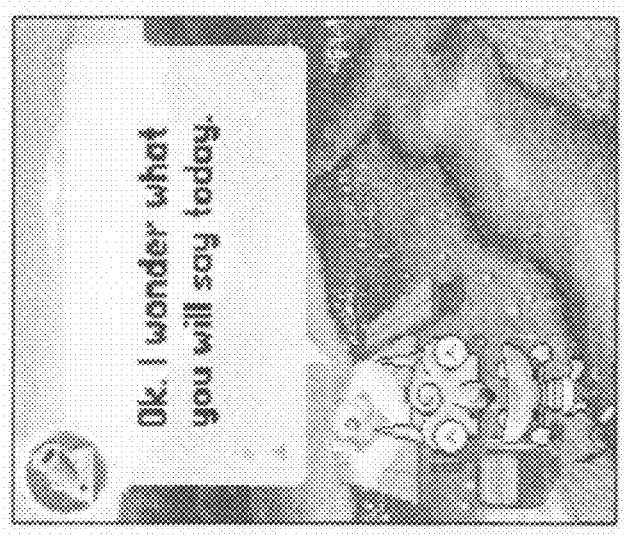
Figure 18C:
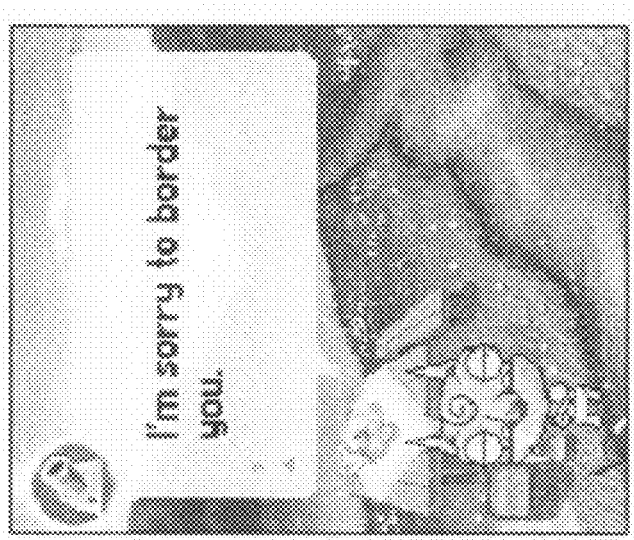

FIGS. 18A-18C represents an avatar which recommends a user to send a message to a sender whose number of received messages is greater than the number of messages sent by the sender when the timer event of ID 14 is generated in FIG. 9 or in Step 1103 of FIG. 12. If a sender exists whose received number of messages is greater than the number of messages sent by the sender, as shown in FIG. 18A, an avatar informs a user that a sender exists whose number of received messages is greater than the number of messages sent by the sender, and displays a test recommending the user to send a message to the corresponding sender. As shown in FIG. 18B, if "1. Yes" is selected and if a predetermined time period elapses or key input is performed for a predetermined key, the avatar disappears and the mode of the portable terminal is converted to a message writing mode for sending a message to the corresponding sender. However, if "2. No" is selected, as shown in FIG. 18C, the avatar displays a text representing that, with a sad expression. Then, if a predetermined time period elapses or key input is performed for a predetermined key, the avatar disappears.

Figure 13:
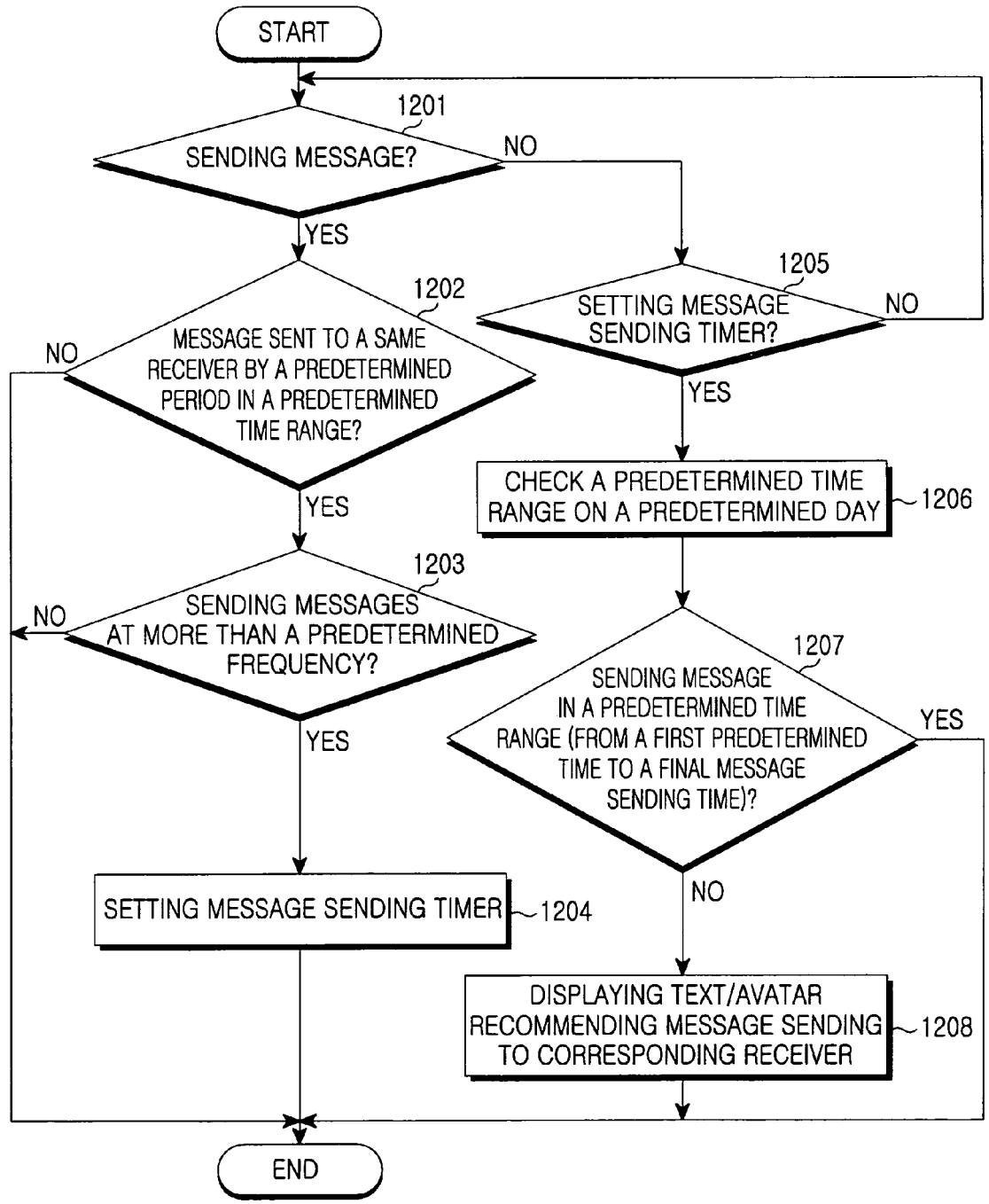
FIG. 13 is a flow chart for recommending that a user send a message to a receiver who sends messages within a predetermined period in a portable terminal according to the second exemplary embodiment of the present invention.

FIG. 13 is a flow chart for showing operation for recommending that a user send a message to a receiver who sends messages by a predetermined period in the portable terminal according to the second exemplary embodiment of the present invention.

Referring to FIG. 13, if a message is sent from the portable terminal, the control unit 100 detects it in Step 1201 and determines whether the corresponding receiver of the sent message is the receiver of the messages sent within a predetermined time range by a predetermined period. If the corresponding receiver of the sent message is the receiver of the messages sent within a predetermined time range by a predetermined period, the control unit 100 detects it in Step 1202 and determines whether the number of the sent messages is more than a predetermined frequency. If the number of the messages sent to the corresponding receiver within a predetermined time range by a predetermined period is more than a predetermined frequency, the control unit 100 detects it in Step 1203 and proceeds with Step 1204 in which the message sending timer is set. The predetermined time range may be, on the basis of the time at which the message is sent to the corresponding receiver, from a first predetermined time, 30 minutes for example, earlier than the time at which the final message is sent to the time at which the final message is sent, from the time at which the final message is sent to a second predetermined time later than the time at which the final message is sent, or from the first predetermined time to the second predetermined time. Therefore, if the message sending timer is set in Step 1204, the final sending time at which the message is sent to the corresponding receiver is stored.

Thereafter, if the message sending timer is set in the portable terminal, the control unit 100 detects it in Step 1205, and proceeds with Step 1206 in which whether the present time is within a predetermined time range of a predetermined day, in which messages are sent to the corresponding receiver by a predetermined period. If the present time is in the predetermined time range of the predetermined day, the control unit 100 detects it, and confirms whether a message is sent to the corresponding receiver in the predetermined time range. In other words, whether a message is sent to the corresponding receiver, from a first predetermined time to the time at which the final message is sent to the corresponding receiver, from the time at which the final message is sent to a second predetermined time, or from the first predetermined time to the second predetermined time, is confirmed. If a message is not sent to the corresponding receiver in the predetermined time range, the control unit 100 detects it in Step 1207, and proceeds with Step 1208 in which the control unit 100 controls the portable terminal to display a text/avatar recommending a use to send a message to the corresponding receiver.

Figure 19A:
FIG. 19A-19C are views of an avatar recommending that a user send a message to a receiver who sends messages within a predetermined period in a portable terminal.
Figure 19B:
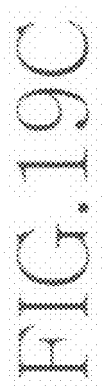
Figure 19C:
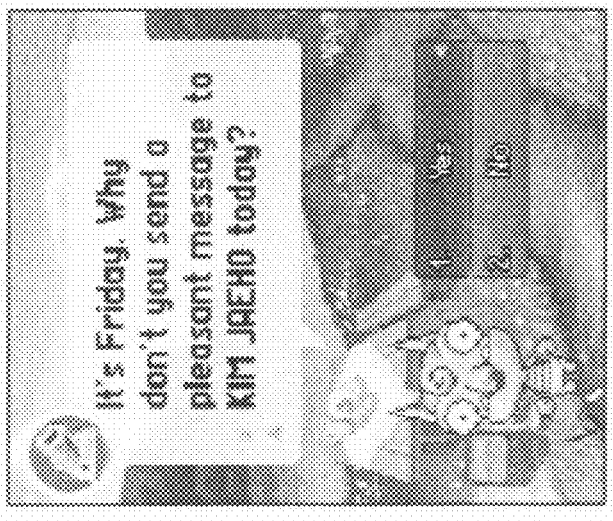

FIGS. 19A-19C shows an avatar which recommends a user to send a message to the corresponding receiver, if the timer event of ID 12 is generated in FIG. 10, or a message is not sent within a predetermined time range of a predetermined day of the week in which messages have been sent to the corresponding receiver at a predetermined frequency, as in FIG. 13. If a message is not sent within a predetermined time range of a predetermined day of a week, as shown in FIG. 19A, the avatar informs the user that it is the day of the week on which messages have been sent to the corresponding receiver by a predetermined period, and displays a text recommending the user to send a message to the corresponding receiver. Then, if "1. Yes" is selected, as shown in FIG. 19B, the avatar displays a text which represents that with a glad expression. After a predetermined time period elapses or if key input is performed for a predetermined key, the avatar disappears and the mode of the portable terminal is converted to a message writing mode for sending a message to the corresponding receiver. Further, if "2. No" is selected, as show in FIG. 19C, the avatar displays a test representing that, with a sad expression. After a predetermined time period elapses or if key input is performed for a predetermined key, the avatar disappears.

Finally, the event processing operation for recommending use of a Multimedia Messaging Service (MMS) in the agent function section of the portable terminal according to the first exemplary embodiment of the present invention will be described. In the case in which a message writing event is generated, the specialist management section stores the message writing event in a blackboard. Thereafter, the specialists called in the timer event of ID 50 are confirmed in the inner specialist list, and the specialists are called.

The called ID 50 specialist confirms whether the MMS use frequency is small. For example, if the MMS use frequency is less than three for a threshold period of time, such as for the past month, the MMS use frequency is regarded as small. After the confirmation, if the MMS use frequency is determined not to be small, 'NO' is returned. Further, if the MMS use frequency is determined to be small, 'YES' is returned.

If the return is performed by the called specialist, such as ID 50, the specialist management section provides the specialist, such as ID 50, which returns 'YES' to the supervision section. Thereafter, the supervision section confirms the priority/performance of the corresponding specialists, and transfers the confirmation result to the specialist management section. Accordingly, the specialist management section confirms the UI-ID of the most prior specialist or the specialist to perform, and transfers the UI-ID to the agent expression section to express the UI-ID.

Figure 14:
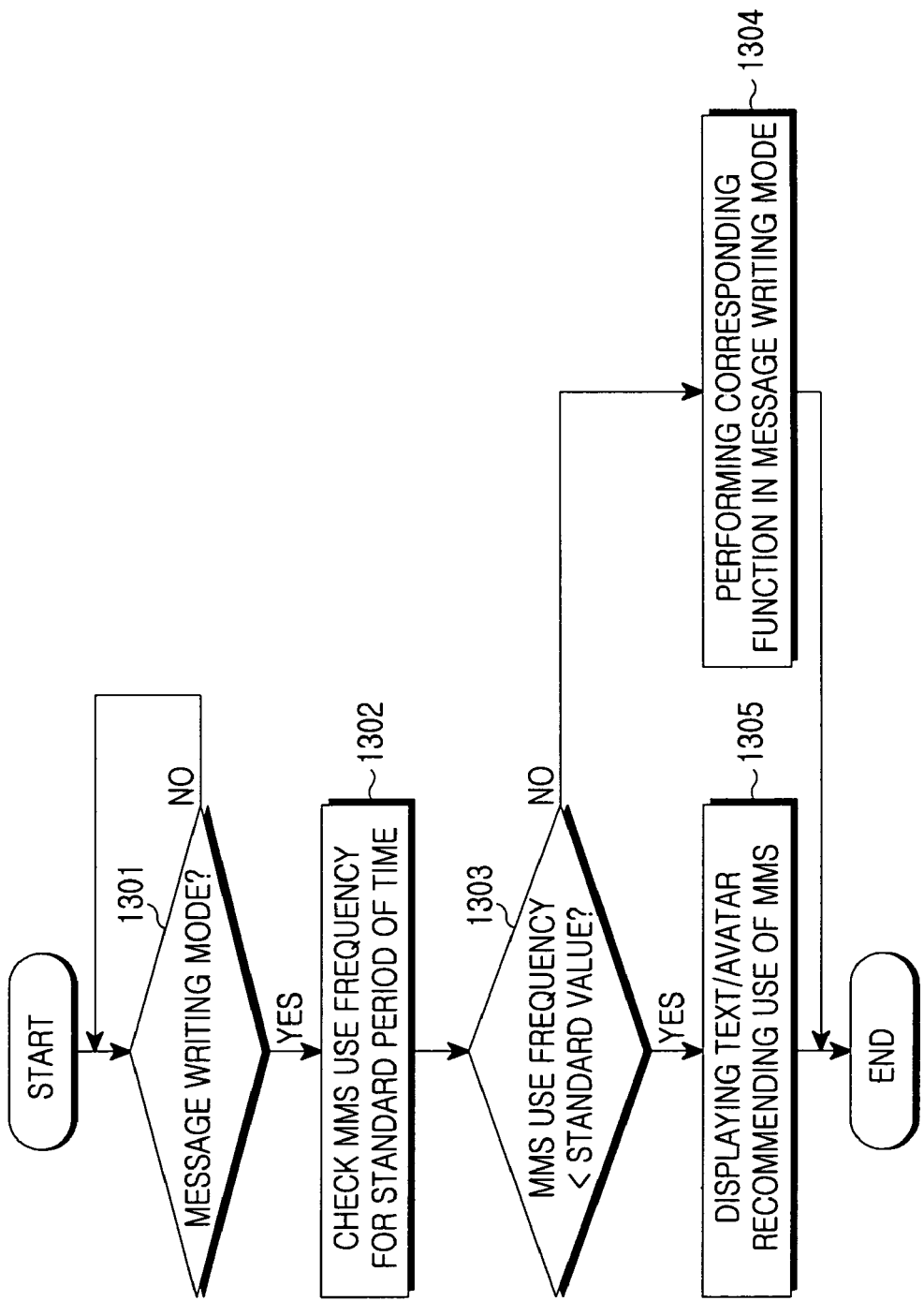
FIG. 14 is a flow chart for recommending that a user use an MMS in a portable terminal according to the second exemplary embodiment of the present invention.

FIG. 14 is a flow chart for recommending that a user use the MMS in the portable terminal according to the second exemplary embodiment of the present invention.

Referring to FIG. 14, the message writing mode of the portable terminal is selected, the control unit 100 detects it in Step 1301, and proceeds with Step 1302 in which the MMS use frequency for a threshold period of time is checked. If the MMS use frequency is more than a threshold frequency for the predetermined period of time, the control unit 100 detects it in Step 1303, and proceeds with Step 1304 in which the message writing mode is performed. However, If the MMS use frequency is less than the threshold frequency for the predetermined period of time, the control unit 100 detects it in Step 1303, and proceeds with Step 1305 in which the control unit 100 controls the portable terminal to display a text/avatar recommending the use of a MMS.

Figure 20A:
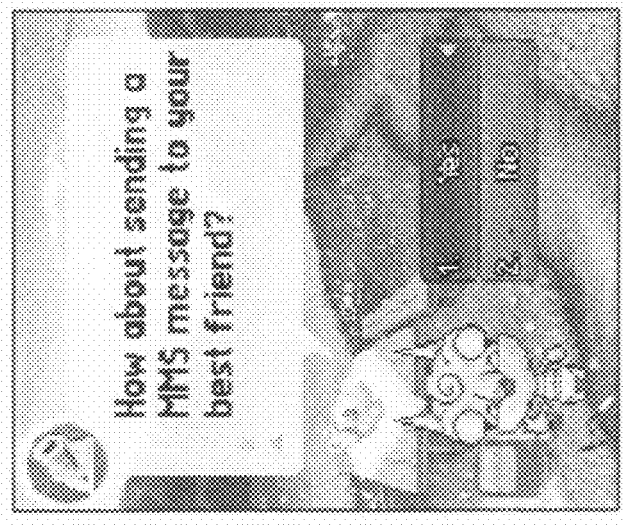
FIG. 20A-20C are views of an avatar recommending that a user use an MMS in a portable terminal.
Figure 20B:
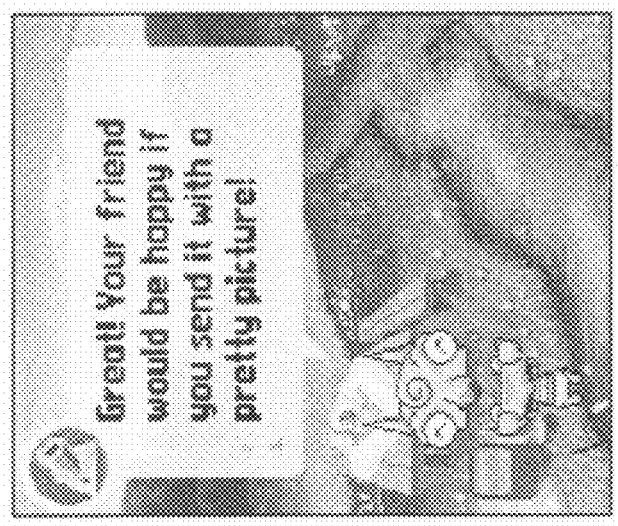
Figure 20C:

FIGS. 20A-20C represent an avatar which recommends a user to use an MMS when the timer event of ID 50 is generated or in Step 1305 of FIG. 14. If the message writing mode is selected, as shown in FIG. 20A, the avatar displays a test recommending the use of the MMS. Then, if "1. Yes" is selected, as shown in FIG. 20B, the avatar displays a text representing that, with a glad expression. After a predetermined time period elapses or if key input is performed for a predetermined key, the avatar disappears and the mode of the portable terminal is converted to the MMS writing mode. However, if "2. No" is selected, as shown in FIG. 20C, the avatar displays a text representing that, with a sad expression. After a predetermined time period elapses or if key input is performed for a predetermined key, the avatar disappears.

As mentioned above, the message-related event processing operations can be performed in the portable terminal according to the exemplary embodiments of the present invention. While the invention has been shown and described with reference to certain exemplary embodiments thereof, it will be understood by those skilled in the art that various changes in form and details may be made therein without departing from the spirit and scope of the invention as defined by the appended claims.

Therefore, according to the exemplary embodiments of the present invention, the message-related events can be expressed through the character agent function, by adding the character agent function to the portable terminal or by using the control unit of the portable terminal, thereby expressing the generation and processing of the events generated in the portable terminal with the avatar UIs.

What is claimed is:

1. A method for processing message-related events in a portable terminal, the method comprising the steps of:
   confirming that specialists of a plurality of specialists have been set in advance so that message-related events can be processed by the confirmed specialists, respectively;
   calling the confirmed specialists to process the message-related events and generate processing results; and
   displaying the processing results with at least a text/avatar according to the processing results;
   wherein, of first, second, and third specialists which process the message reception event, the first specialist confirms unread messages in the message in-box and sets a timer if the number of the unread messages is more than a threshold value, the second specialist confirms whether messages of the corresponding sender have been ignored continuously at more than a threshold frequency, and the third specialist confirms whether the number of the corresponding sent messages has performed contact for a threshold period of time and at more than a threshold frequency and then confirms whether the number of the corresponding sent messages exists in a directory.

2. A method according to claim 1, wherein the message-related events comprise at least one of a message reception event, a message sending event, a received message reading event, and a timer event set by a specialist, which are set so as to process the message-related events, respectively.

3. A method according to claim 2, wherein, of third and fourth specialists which process the message sending event, the third specialist confirms whether the phone number of the corresponding sending messages has performed contact for a threshold period of time and at more than a threshold frequency and then confirms whether the phone number exists in the directory, and the fourth specialist confirms whether messages have been sent to the corresponding receiver by a threshold period, in threshold time range, and at more than a threshold frequency and then sets a timer.

4. A method according to claim 3, wherein, if the timer set by the fourth specialist is generated, at least one of a text and an avatar recommending that a user send a message is displayed by the fourth specialist.

5. A method according to claim 2, wherein a fifth specialist processing the message writing event confirms the Multimedia Messaging Service (MMS) use frequency for a threshold period of time in a message writing mode, and a text/avatar recommending that a user use an MMS, if the MMS use frequency is less than a threshold value for the period of time, is displayed by the fifth specialist.

6. A method according to claim 2, wherein a sixth specialist processing the timer event sets timers by a threshold period and confirms whether a corresponding sender exists whose number of received messages is greater than a number of sent messages, if the timers are generated, and at least one of a text and an avatar recommending that a user send a message to the corresponding sender whose number of received messages is greater than the number of sent messages, is displayed by the sixth specialist.

7. A method according to claim 1, wherein, if the timer set by the first specialist is generated, at least one of a text and an avatar recommending that a user perform at least one of a confirming and an arranging of unread messages in the message in-box is displayed by the first specialist.

8. A method according to claim 1, wherein at least one of a text and an avatar recommending that a user perform at least one of an ignoring and a rejecting of the corresponding received message, according to the processing result informing the user that the messages of the corresponding sender have been ignored continuously at more than a threshold frequency, is displayed by the second specialist.

9. A method according to claim 1, wherein at least one of a text/avatar recommending that a user add the phone number of the corresponding received messages to a directory, according to the processing result informing the user that the phone number of the corresponding received messages has performed contact for a threshold period of time and at more than a threshold frequency but does not exist in the directory, is displayed by the third specialist.

10. A method according to claim 1, wherein at least one of a text and an avatar recommending that a user add the phone number of the corresponding sent messages to a directory, according to the processing result informing the user that the phone number of the corresponding sent messages has performed contact for a threshold period of time and at more than a threshold frequency but does not exist in the directory, is displayed by the third specialist.

11. The method according to claim 1 further comprising the steps of:
checking the number of unread messages in the portable terminal; and
displaying at least one of a text and an avatar recommending that a user confirm/arrange the unread messages, if the number of the unread messages is greater than a threshold value.

12. A method according to claim 11, wherein the number of the unread messages of all the messages stored in the message in-box of the portable terminal is checked, when a message is received by the portable terminal or by a threshold period.

13. A method according to claim 11, further comprising the step of
displaying the unread messages if the at least one of a confirmation and an arrangement of the unread messages is selected.

14. The method according to claim 1 further comprising the steps of:
checking the former message state with respect to the corresponding sender of the received messages, if a message is received by the portable terminal; and
displaying at least one of a text and an avatar recommending that a user at least one of ignore and reject the received messages, if the former messages of the corresponding sender have been ignored continuously at more than a threshold frequency.

15. A method according to claim 14, further comprising the steps of:
displaying at least one of a text and an avatar recommending that a user at least one of ignore and reject the received messages and the kinds of selection items with respect to the received messages;
displaying the contents of the received messages, if "Check message" of the kinds of the selection items is selected;
setting "Check message later" of the received messages, if "Check message later" of the kinds of the selection items is selected;
deleting the received messages automatically, if "Automatic deletion of message" of the kinds of the selection items is selected; and
displaying the steps with at least one of a text and an avatar.

16. A method according to claim 14, wherein, if the former messages of the corresponding sender have been deleted without confirming the messages continuously at more than a threshold frequency or have not been confirmed until a threshold time elapses, the messages of the corresponding sender is determined to be ignored.

17. The method according to claim 1 further comprising the steps of:
determining whether a corresponding sender whose received messages are more than the sent messages exists in the portable terminal; and
displaying at least one of a text and an avatar recommending that a user send a message to the corresponding sender, if the corresponding sender exists.

18. A method according to claim 17, wherein, of the messages stored in a message in-box of the portable terminal by a threshold period, whether a corresponding sender exists whose number of received messages are greater than a number of sent messages is determined.

19. A method according to claim 17, wherein, if a message sending to the corresponding sender is selected, the mode of the portable terminal is converted to a message writing mode for sending a message to the corresponding sender.

20. The method according to claim 1 further comprising the steps of:
determining whether a message which has been sent is the message sent to a same receiver by a threshold period within a threshold time range at more than a threshold frequency;
setting a message sending timer, if the message which has been sent is the message sent to the same receiver by the threshold period in the threshold time range at more than the threshold frequency;
determining whether a message is sent to the corresponding receiver within a threshold time range of a threshold day, in which the message is sent, if the message sending timer is set; and
displaying at least one of a text and an avatar recommending that a user send a message to the corresponding receiver, if a message is not sent to the corresponding receiver.

21. A method according to claim 20, further comprising the step of:
    converting the mode of the portable terminal to a message writing mode for sending a message to the corresponding receiver, in the case message sending to the corresponding receiver is selected.

22. A method according to claim 20, wherein the threshold time range is from a first threshold time earlier than a time at which a message is sent to the corresponding receiver to the time at which the message is sent, or from a time at which a message is sent to a second threshold time later than the time at which the message is sent.

23. A method according to claim 20, wherein the threshold time range is from a first threshold time to a second threshold time.

24. The method according to claim 1 further comprising the steps of:
    checking a generation period and a generation time range of a corresponding event, if the corresponding event is generated in the portable terminal;
    setting a timer of a corresponding event, if the corresponding event is generated repeatedly by a threshold period within a threshold time range at more than a threshold frequency;
    determining whether a corresponding event is generated within a threshold time range of a threshold day in which the corresponding event is generated by a threshold period, if the timer of the corresponding event is set; and
    displaying at least one of a text and an avatar recommending generation of a corresponding event, if the corresponding event is not generated.

25. A method according to claim 24, wherein the threshold time range is from a first threshold time earlier than a time at which a corresponding event is generated to the time at which the corresponding event is generated, or from a time at which a corresponding event is generated to a second threshold time later than the time at which the corresponding event is generated.

26. A method according to claim 25, wherein the threshold time range is from a first threshold time to a second threshold time.

27. The method according to claim 1 further comprising the steps of:
    checking the MMS use frequency for a threshold period of time in the portable terminal; and
    displaying at least one of a text and an avatar recommending that a user use the MMS, if the MMS use frequency is less than a threshold frequency for a threshold period of time.

28. A method according to claim 27, wherein, if a message writing mode is selected in the portable terminal, the MMS use frequency is checked for a threshold period of time.

29. A method according to claim 27, further comprising the step of:
    converting the mode of the portable terminal to the MMS writing mode, if the MMS use is selected.

30. The method according to claim 1 further comprising the steps of:
    determining whether a corresponding number of received/sent messages has performed contact for a threshold period of time and at more than a threshold frequency, if a message is at least one of received and sent in the portable terminal;
    determining whether the corresponding number of the received/sent messages exists in a directory, if the corresponding number of the at least one of received and sent messages is determined to perform contact for the threshold period of time and at more than the threshold frequency; and
    displaying at least one of a text and an avatar recommending that a user add the corresponding number to a directory, if the corresponding number of the received/sent messages does not exist in the directory.

31. A method according to claim 30, wherein the corresponding number of the at least one of received and sent messages determines performance of contact through at least one of reception and sending records of the messages.

32. A method according to claim 30, further comprising the steps of:
    displaying kinds of storing the corresponding number, if the addition of the corresponding number to the directory is selected; and
    adding the corresponding number to the directory in the kind of storing the selected number, of the kinds of storing the displayed numbers.

33. A device for processing message-related events in a portable terminal, the device comprising:
    a memory for storing a character User Interface (UI) image according to a message-related event generated in the portable terminal;
    an event collection section for detecting the generated message-related event and for generating an event message for discriminating the generated message-related event;
    an agent control section comprising a plurality of specialists for message-related events, the agent control section confirming that specialists of the plurality of specialists have been set in advance so that the message-related events can be processed by the confirmed specialists, and calling the confirmed specialists to process the message-related events and generate processing results, the agent control section selecting and outputting a character UI identification (ID) according to the processing results; and
    an agent expression section for accessing and outputting at least one of a character image and a text corresponding to the character UI ID,
    wherein the agent control comprises a specialist which confirms the Multimedia Messaging Service (MMS) use frequency in a message writing mode for a threshold period of time, and informs a user of using the MMS, if the MMS use frequency is less than a threshold value.

34. A device according to claim 33, wherein the agent control section comprises a specialist which sets a timer when the number of unread messages in a message in-box is greater than a threshold value and informs a user of at least one of a confirmation and an arrangement of the unread messages, if the timer event is generated.

35. A device according to claim 33, wherein the agent control section comprises a specialist which confirms whether messages of a corresponding sender have been ignored at more than a threshold frequency and informs a user of at least one of an ignorance and a rejection of the messages received from the corresponding sender, which have been ignored at more than the threshold frequency.

36. A device according to claim 33, wherein the agent control section comprises a specialist which sets a timer by a threshold period, and if a timer event is generated the specialist confirms a corresponding sender whose number of received messages is more than a number of sent messages and informs a user that a message should be sent to the corresponding sender.

37. A device according to claim 33, wherein the agent control section comprises a specialist which sets a timer when a plurality of messages are sent to the corresponding receiver within a threshold time range by a threshold period of time, and if the timer event is generated, informs a user of the sent messages to the corresponding receiver.

38. A device according to claim 33, wherein the agent control section comprises a specialist which confirms whether a corresponding number of the at least one of received and sent messages have performed contact for a threshold period of time and at more than a threshold frequency, confirms whether the corresponding number exists in a directory, if the contact is confirmed to be performed for the threshold period of time and at more than the threshold frequency, and informs a user to add the corresponding number to the directory, if the corresponding number does not exist in the directory.

39. A device according to claim 33, wherein the memory stores: a character UI image informing a user of at least one of a confirming and an arranging unread messages of a message in-box; a character UI image informing a user of at least one of an ignoring and an rejecting the messages received from a corresponding sender whose messages have been ignored continuously at more than a threshold frequency; a character UI image informing a user of sending a message to a corresponding sender whose received messages are more than the sent images; a character UI image informing a user of sending a message to a corresponding receiver who has sent a plurality of messages within a threshold time range at a threshold period; and a character UI image informing a user of using an MMS; and a character UI image informing a user of adding the corresponding number of the received/sent messages to a directory.

* * * * *